US012572970B2

(12) United States Patent
Jafa et al.

(10) Patent No.: US 12,572,970 B2
(45) Date of Patent: Mar. 10, 2026

(54) INTERACTIVE VENDING MACHINE

(71) Applicant: PepsiCo, Inc., Purchase, NY (US)

(72) Inventors: Emad Jafa, Brewster, NY (US); Cheuk Chi Lau, White Plains, NY (US); Xuejun Li, Pleasantville, NY (US); Darren Ling, New Hyde Park, NY (US); Bernard Yang, Edison, NJ (US)

(73) Assignee: PepsiCo, Inc., Purchase, NY (US)

( * ) Notice: Subject to any disclaimer, the term of this patent is extended or adjusted under 35 U.S.C. 154(b) by 198 days.

(21) Appl. No.: 18/150,059

(22) Filed: Jan. 4, 2023

(65) Prior Publication Data

US 2023/0145879 A1    May 11, 2023

Related U.S. Application Data

(62) Division of application No. 16/907,933, filed on Jun. 22, 2020, now Pat. No. 11,587,141.

(51) Int. Cl.
| | |
|---|---|
| *G06Q 30/0601* | (2023.01) |
| *G06F 3/16* | (2006.01) |
| *G06Q 10/087* | (2023.01) |
| *G06Q 20/18* | (2012.01) |
| *G06Q 20/20* | (2012.01) |
| *G06V 40/16* | (2022.01) |
| *G07F 11/00* | (2006.01) |
| *G10L 15/26* | (2006.01) |

(52) U.S. Cl.
CPC ......... *G06Q 30/0631* (2013.01); *G06F 3/165* (2013.01); *G06Q 10/087* (2013.01); *G06Q 20/18* (2013.01); *G06Q 20/203* (2013.01);

*G06Q 30/0627* (2013.01); *G06Q 30/0633* (2013.01); *G06V 40/172* (2022.01); *G07F 11/00* (2013.01); *G10L 15/26* (2013.01)

(58) Field of Classification Search
None
See application file for complete search history.

(56) References Cited

U.S. PATENT DOCUMENTS

| | | | |
|---|---|---|---|
| 6,298,324 | B1 | 10/2001 | Zuberec et al. |
| 8,312,660 | B1 | 11/2012 | Fujisaki |
| | | (Continued) | |

FOREIGN PATENT DOCUMENTS

| | | |
|---|---|---|
| CN | 101595491 A | 12/2009 |
| CN | 201741202 U | 2/2011 |
| | (Continued) | |

OTHER PUBLICATIONS

Extended European Search Report issued in counterpart European Application No. 21828142.6, mailed Jun. 24, 2024 (8 pages).
(Continued)

*Primary Examiner* — Fateh M Obaid
(74) *Attorney, Agent, or Firm* — Sterne, Kessler, Goldstein & Fox P.L.L.C.

(57) ABSTRACT

A method of presenting product information in a vending machine may include detecting audio information from a consumer and converting the audio information to a text string. The method may include identifying a keyword in the text string, and determining products from a product database associated with the keyword. The method may include returning a list of the products that correspond to the keyword.

20 Claims, 16 Drawing Sheets

(56) References Cited

U.S. PATENT DOCUMENTS

| | | | | |
|---|---|---|---|---|
| 8,639,214 | B1 | 1/2014 | Fujisaki | |
| 8,645,971 | B2 | 2/2014 | Carlson et al. | |
| 10,726,246 | B1* | 7/2020 | McClellan | G07F 9/002 |
| 10,902,705 | B1* | 1/2021 | Rose | H04L 63/0823 |
| 10,904,259 | B1* | 1/2021 | Rose | G06N 3/045 |
| 11,017,688 | B1* | 5/2021 | Arazi | G06Q 30/0249 |
| 2007/0055573 | A1* | 3/2007 | Grell | G06Q 30/06 705/24 |
| 2008/0161082 | A1 | 7/2008 | Walker et al. | |
| 2008/0294438 | A1 | 11/2008 | Geisel et al. | |
| 2010/0268792 | A1 | 10/2010 | Butler et al. | |
| 2013/0054695 | A1* | 2/2013 | Holman | G09B 19/00 709/204 |
| 2014/0179231 | A1 | 6/2014 | Charania et al. | |
| 2015/0325076 | A1* | 11/2015 | Holman | G07F 9/001 700/235 |
| 2016/0012465 | A1 | 1/2016 | Sharp | |
| 2016/0058375 | A1* | 3/2016 | Rothkopf | G06F 1/163 600/323 |
| 2018/0174125 | A1* | 6/2018 | Mao | G07F 9/026 |
| 2018/0285959 | A1 | 10/2018 | Peyer et al. | |
| 2019/0147687 | A1* | 5/2019 | Meduri | G07F 11/42 221/1 |
| 2020/0105084 | A1 | 4/2020 | Li | |
| 2021/0174347 | A1* | 6/2021 | Rose | H04L 63/0428 |
| 2021/0176239 | A1* | 6/2021 | Rose | H04W 12/72 |
| 2021/0319408 | A1* | 10/2021 | Jorasch | H04L 12/1827 |
| 2021/0373676 | A1* | 12/2021 | Jorasch | G06F 3/038 |
| 2021/0374391 | A1* | 12/2021 | Jorasch | G06V 40/19 |
| 2021/0398188 | A1 | 12/2021 | Jafa et al. | |

FOREIGN PATENT DOCUMENTS

| | | |
|---|---|---|
| CN | 107248222 A | 10/2017 |
| CN | 107909715 A | 4/2018 |
| CN | 109658191 A | 4/2019 |
| CN | 109817217 A | 5/2019 |
| JP | 2000090351 A | 3/2000 |
| JP | 2004078876 A | 3/2004 |
| WO | WO-2019209566 A1 | 10/2019 |

OTHER PUBLICATIONS

International Search Report and Written Opinion in International Application No. PCT/US2021/036787 dated Nov. 8, 2021 (12 pages).

* cited by examiner

500

IDENTIFY USER BY
FACIAL RECOGNITION — 510

*IF IDENTIFIED*                    *IF NOT IDENTIFIED*

520                                                 530

ACCESS USER ACCOUNT          PROMPT TO CREATE ACCOUNT

SELECT PRODUCTS
FOR PURCHASE — 540

COMPLETE TRANSACTION AND
DISPENSE SELECTED PRODUCTS — 550

CHARGE USER ACCOUNT — 560

600

602

RECEIVE AUDIO INFORMATION
FROM CONSUMER

604

GENERATE TEXT STRING BASED
ON AUDIO INFORMATION

606

ANALYZE TEXT STRING
FOR A KEYWORD

608

SEARCH DATABASE OF PRODUCT
INFORMATION FOR PRODUCTS
ASSOCIATED WITH THE KEYWORD

610

RETURN PRODUCTS ASSOCIATED
WITH THE KEYWORD

600

RECEIVE SECOND
AUDIO INFORMATION — 612

GENERATE SECOND TEXT
STRING BASED ON SECOND
AUDIO INFORMATION — 614

ANALYZE SECOND TEXT STRING
FOR SECOND KEYWORD — 616

SEARCH DATABASE FOR
PRODUCTS ASSOCIATED
WITH SECOND KEYWORD — 618

RETURN MODIFIED LIST OF
PRODUCTS ASSOCIATED WITH
FIRST AND SECOND KEYWORDS — 620

1000

1010
DETERMINE LOCATION
INFORMATION

1020
DETECT DEMOGRAPHIC
INFORMATION

1030
RECEIVE BIOMETRIC
INFORMATION FROM PORTABLE
ELECTRONIC DEVICE

1040
RECEIVE PURCHASE HISTORY
AND FAVORITE PRODUCTS

1050
SEARCH PRODUCT DATABASE
FOR PRODUCTS HAVING TAGS
ASSOCIATED WITH
COLLECTED INFORMATION

1060
PROVIDE RECOMMENDATION
BASED ON COLLECTED
INFORMATION AND DATABASE
OF PRODUCTS

1400

INTERACTIVE VENDING MACHINE

CROSS REFERENCE TO RELATED APPLICATION

This application is a divisional of U.S. application Ser. No. 16/907,933, filed Jun. 22, 2020, which is incorporated herein by reference in its entirety.

FIELD

Embodiments described herein generally relate to interactive vending machines. Specifically, embodiments described herein relate to vending machines that are capable of allowing a consumer to navigate available products by recognizing the consumer's speech and providing a product recommendation to the consumer.

BACKGROUND

Vending machines generally require a consumer to make a payment, select a product available for purchase, and wait for the product to be dispensed. Some vending machines allow the consumer to make a product selection by pressing a button having an image of the desired product. Some vending machines include a storage compartment that is visible from the exterior of the vending machine so that the consumer may view the available products. The consumer may then enter a code into a keypad to cause the desired product to be dispensed. Such vending machines may not help a consumer make a product selection and may provide limited or no information about the products available for purchase.

BRIEF SUMMARY OF THE INVENTION

Some embodiments described herein relate to a method of presenting product information in a vending machine, the method including detecting audio information from a consumer, converting the audio information to a text string, identifying a keyword in the text string, determining one or more products from a product database associated with the keyword, and returning a list of the one or more products associated with the keyword.

In any of the various embodiments discussed herein, the method of presenting product information may further include detecting second audio information from the consumer, converting the second audio information to a second text string, identifying a second keyword in the second text string, determining one or more products from the list of the one or more products that correspond to the second keyword, and returning a modified list of the one or more products that correspond to both the keyword and the second keyword.

In any of the various embodiments discussed herein, detecting audio information from a consumer may be performed by a microphone of a vending machine.

In any of the various embodiments discussed herein, the method of presenting product information may further include transmitting the audio information to a remote computer prior to converting the audio information to a text string, and converting the audio information to a text string may occur at the remote computer.

In any of the various embodiments discussed herein, the keyword may be a brand.

In any of the various embodiments discussed herein, the keyword may be a flavor.

In any of the various embodiments discussed herein, the keyword may be an ingredient.

In any of the various embodiments discussed herein, the method of presenting product information may further include in response to the audio information, playing a response by the vending machine. In some embodiments, playing a response may include playing at random a response from a list of responses.

In any of the various embodiments discussed herein, the method may further include identifying a command in the text string, and performing an action by the vending machine based on the command. In some embodiments, the command may include adding or removing a product to an electronic shopping cart.

Some embodiments described herein relate to a method of providing a product recommendation to a consumer by a vending machine, the method including receiving location information at the vending machine, receiving user information at the vending machine, determining one or more tags corresponding to the location information and the user information, identifying products in a product database associated with the one or more tags, and providing a product recommendation based on the one or more tags.

In any of the various embodiments discussed herein, receiving user information may include receiving biometric information from a portable electronic device of the user.

In any of the various embodiments discussed herein, the location information may include a time and a temperature at the location of the vending machine.

In any of the various embodiments discussed herein, the user information may include an emotion of the user as determined by a camera of a vending machine.

In any of the various embodiments discussed herein, the user information may include demographic information as determined by a camera of the vending machine.

Some embodiments described herein relate to a method of tracking consumer engagement by a vending machine having a camera, the method including detecting a consumer in a field of view of the camera of the vending machine, determining an orientation of the consumer, engaging the consumer when the consumer is facing the vending machine, detecting speech of the consumer engaged with the vending machine; and receiving a product selection from the consumer by detecting the speech of the consumer.

In any of the various embodiments discussed herein, determining an orientation of the consumer may include detecting an eye of the consumer.

In any of the various embodiments discussed herein, the method may further include detecting a second consumer in the field of view of the camera, and applying noise-cancellation to speech of the second consumer when the consumer is engaged with the vending machine.

In any of the various embodiments discussed herein, detecting speech of the consumer may include tracking movement of lips of the consumer.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

Vending machines generally provide little assistance to the consumer in making a product selection. To make a product selection, the consumer must simply review the various products and make a decision. The consumer is unable to learn about available products or filter the products based on desired characteristics, such as flavor, calories, or brand, among other criteria. This is particularly problematic if the consumer is not familiar with one or more available products, and as a result, the consumer may be unwilling to purchase a new product. The consumer may not closely examine all products, and may prefer to quickly select a product. As a result, the consumer may fail to notice a desirable product or may be unsatisfied with the selected product. If the consumer is unsatisfied with their experience, the consumer may be unlikely to make additional purchases or return for future purchases. Thus, a vending machine that allows a consumer to view and refine available products based on consumer defined criteria is desired.

While some vending machines may communicate with a consumer, such vending machines may simply make the same suggestion for every customer. Alternatively, vending machines may prompt the user to make a series of selections to identify a product for purchase. Making a series of selections may be time-consuming and tedious, and may not result in an accurate product recommendation if the series of selections are not related to the consumer's preferences. Thus, a vending machine that provides a product recommendation specific to the consumer and his or her preferences is desired.

Further, some vending machines may require a user to manually operate a touch-screen or other input device to make a product selection. Manually navigating a list of available products or typing in product codes to select a product may be inconvenient for the consumer. This may also increase the effort required for the consumer to purchase a product and introduces a risk of user error in operating the vending machine. Consumers may prefer to view available products and make a selection without having to contact the vending machine to simplify the transaction and also to prevent the spread of germs. Thus, a vending machine that allows a consumer to perform a transaction by speaking naturally and without contacting the vending machine is desired.

Figure 1:
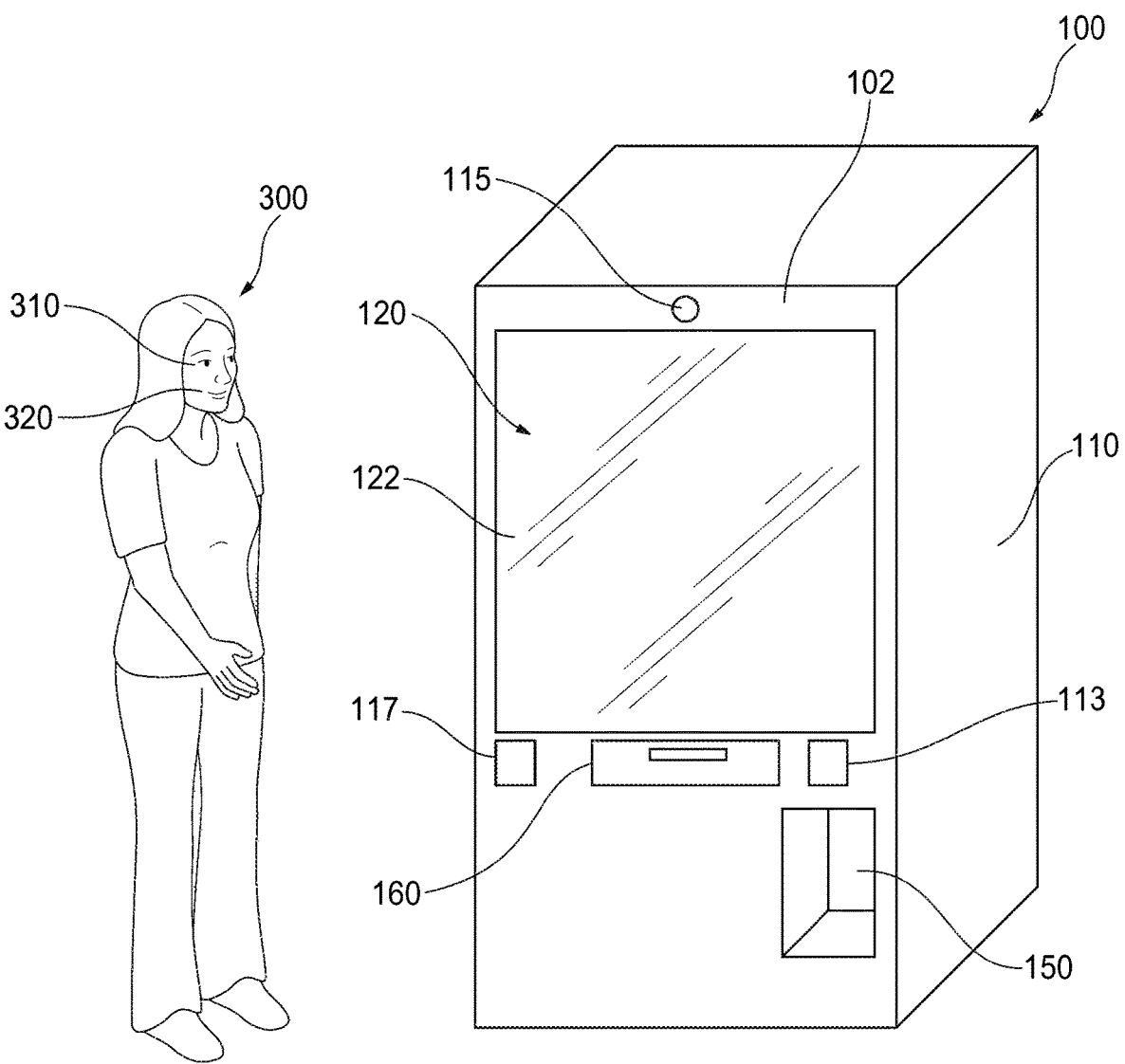
FIG. 1 shows a perspective view of a vending machine according to an embodiment.

In some embodiments, a vending machine 100 may include a housing 110, as shown in FIG. 1. Housing 110 may be shaped as a cube, a rectangular prism, a cylinder, among other shapes. In some embodiments, vending machine 100 may be configured to dispense packaged beverages, such as bottled or canned beverages. However, vending machine 100 may be used to dispense any of various products, such as snacks, office supplies, medical supplies, and other merchandise.

Vending machine 100 may include a user interface 120 for interacting with a consumer, such as to provide instructions for operating vending machine 100 and product information, among other information. User interface 120 that may include a display 122. Display 122 may be a liquid crystal display (LCD), a light emitting diode (LED) display, an organic LED (OLED) display, among others. Display 122 may be arranged on a front 102 of housing 110.

In some embodiments, display 122 may show available products, product information, and selected products. In some embodiments, display 122 may be used to display images or videos, such as advertisements, or may display the time and/or weather to attract and entertain consumers. As a result, housing 110 may be opaque so that products stored within housing 110 are not visible to the consumer as the products may instead be viewed on display 122. In some embodiments, display 122 may be a touchscreen display so that a consumer may provide user input by touching a portion of the touchscreen display. For example, a consumer may touch the portion of display 122 at which a product is displayed in order to select that product for purchase. In some embodiments, user interface 120 may include one or more actuators 124 (see, e.g., FIG. 4), such as buttons, levers, dials, switches, or the like for navigating available products and making product selections. While consumer may operate vending machine 100 by speech, in some embodiments, consumer may alternatively touch a portion of display 122 to select a product, or operate an actuator 124 to select a product. Further, consumer may touch display 122 or operate actuator 124 to complete a transaction and cause products to be dispensed.

Vending machine 100 may include a microphone 117 for receiving audio information from the consumer, and a speaker 113 for playing audio responses. Vending machine 100 may receive and analyze consumer speech via microphone 117 and may play responses via speaker 113 so that the vending operation provides the experience of a conversation. In this way, a consumer may perform at least part of the product selection and dispensing operation by speech alone, without having to manually provide user input to navigate products, select a product, and to provide payment.

Vending machine 100 may include a camera 115 for detecting a consumer 300 proximate to vending machine 100. In some embodiments, camera 115 may further detect eyes 310 of consumer 300 to determine consumer engagement, and may additionally or alternatively detect a mouth 320 of consumer 300 to aid in speech recognition, as discussed in further detail below.

In some embodiments, a payment processing unit 160 may be arranged on housing 110 for receiving a source of payment from a consumer. Payment processing unit 160 may include a slot for receiving coins or paper bills; a card reader for reading a magnetic stripe or electronic chip of a payment card, such as a debit card, credit card, gift card, or the like; a wireless antenna for receiving contactless payments; a scanner for scanning a code displayed on a mobile electronic device; a transceiver for communicating with a mobile electronic device for receiving mobile payments, such as Apple Pay or Google Pay, among others. In some embodiments, vending machine 100 may not include a payment processing unit 160 and may instead identify a consumer via biometric information, such as facial recognition, so that a corresponding account linked to the consumer's identity may be charged. In this way, the consumer need not provide a payment source at the time of the transaction, as discussed in further detail below.

Figure 2:
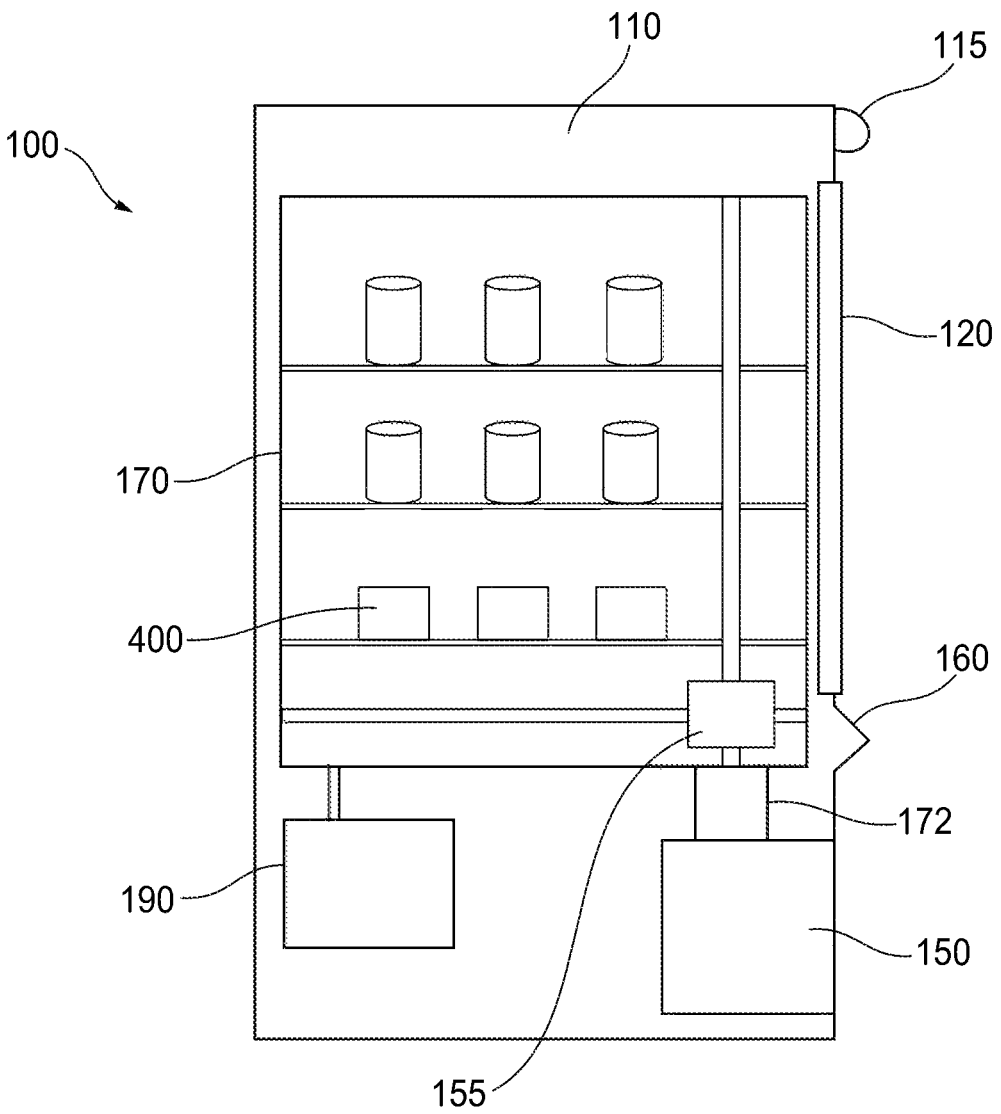
FIG. 2 shows a diagram of a vending machine showing interior components according to an embodiment.

Vending machine 100 may include a storage compartment 170 arranged within housing 110 for storing one or more products 400 available for purchase, as shown in FIG. 2. Storage compartment 170 may be maintained at ambient temperature or may be a temperature-controlled storage compartment 170. In some embodiments, storage compartment 170 may be refrigerated. In such embodiments, vending machine 100 may include a cooling unit 190 for maintaining storage compartment 170 at a predetermined temperature. Cooling unit 190 may be a vapor-compression refrigeration unit, a thermoelectric cooling unit, or a cold plate, among others. Storage compartment 170 may be insulated to maintain storage compartment 170 at a specific temperature or range of temperatures. Housing 110 may have opaque walls so that storage compartment 170 and products in storage compartment 170 are not visible to consumers. Storage compartment 170 may be fully enclosed so that storage compartment 170 cannot be accessed by consumers. As a result, the temperature of storage compartment 170 can be precisely maintained.

Vending machine 100 may include a dispensing mechanism 155 for conveying products 400 from storage compartment 170 to a dispensing opening 150 arranged on housing 110. In some embodiments, storage compartment 170 may be in communication with dispensing opening 150 via a chute 172. Dispensing mechanism 155 may include a screw drive, an articulating arm, a gravity-fed dispenser having movable gates, or an automated movable basket, among others.

Figure 3:
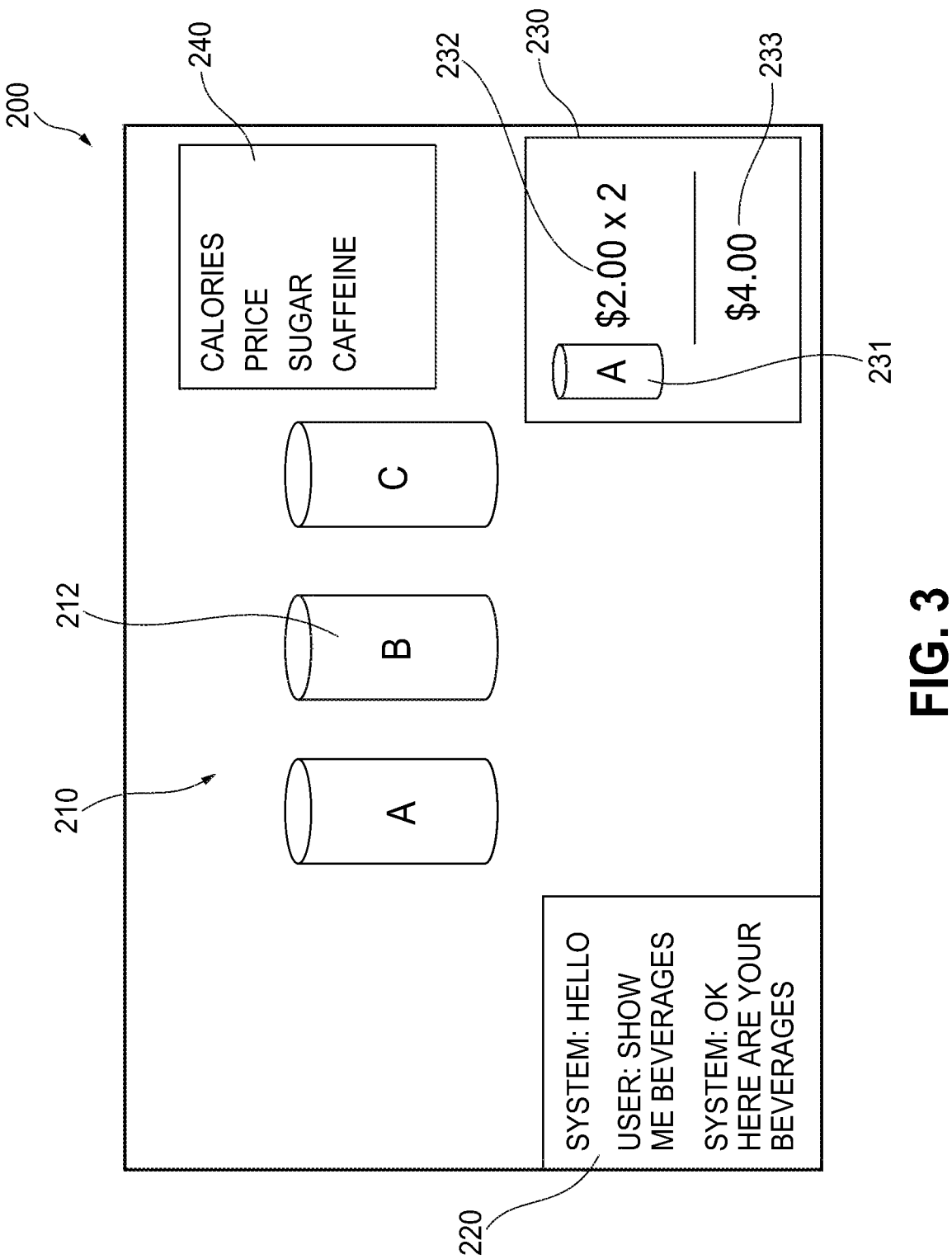
FIG. 3 shows a graphical user interface for a vending machine according to an embodiment.

In some embodiments, display 122 may be configured to show a graphic user interface, as shown in FIG. 3. Graphic user interface 200 may display available products 210, such as by displaying product images 212, and may display product information 240, such as brand, flavor, size (weight/volume), cost, and nutritional information (e.g., calories or ingredients), among other product information. In some embodiments, graphic user interface 200 may display a transcript of a conversation 220 between vending machine 100 and the consumer. This may allow the consumer to confirm that vending machine 100 accurately interpreted the consumer's speech. Graphic user interface 200 may display an electronic shopping cart 230 showing the products the consumer has selected for purchase. Electronic shopping cart 230 may include one or more of a name or image of each product 231 selected, an amount of each product selected, a cost of each product 232 selected, and a total cost 233 of the products in the electronic shopping cart 230, among other information.

Figure 4:
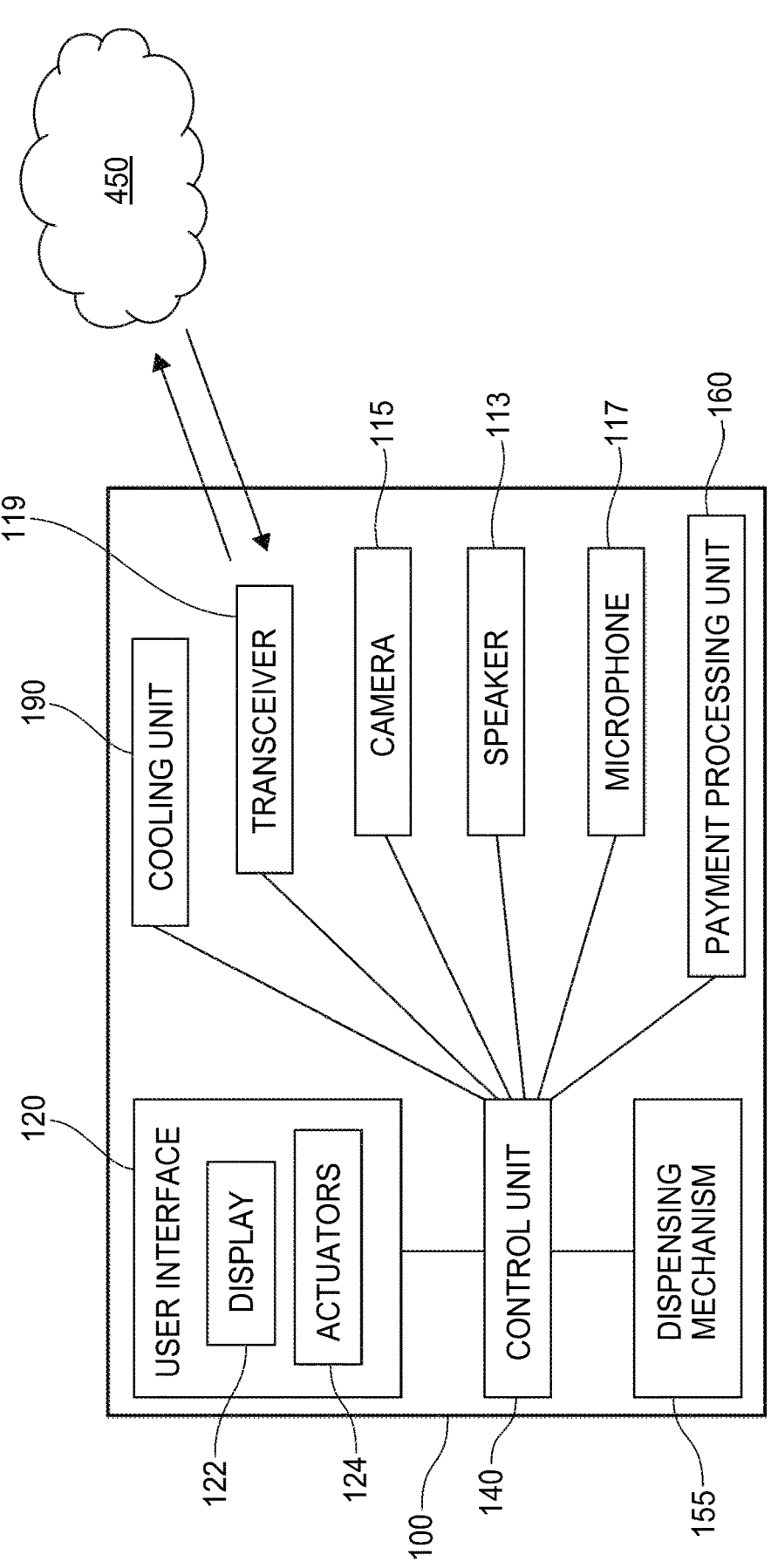
FIG. 4 shows a schematic diagram of components of a vending machine according to an embodiment.

In some embodiments, vending machine 100 may include a control unit 140 configured to control operation of vending machine 100, as shown in FIG. 4. Control unit 140 may be in communication with camera 115 and microphone 117 of vending machine 100 for detecting a consumer and receiving audio information from the consumer, respectively. In some embodiments, control unit 140 may receive user input via actuators 124 and/or display 122. Control unit 140 may further be in communication with user interface 120 and may update the information displayed on display 122 based on the audio information received from the consumer (e.g., displaying available products, selected products, and product information, among other information), and control unit 140 may further be in communication with a speaker 113 for playing responses. Control unit 140 may further be in communication with a transceiver 119 or other communication device for communicating with a computer, server, or cloud, located remotely from vending machine 100, referred to herein simply as a "remote computer." Remote computer 450 may analyze and interpret the audio information from the consumer received by microphone 117. Control unit 140 may be in communication with a dispensing mechanism 155 for dispensing the products selected by the consumer. Further, in some embodiments, control unit 140 may be in communication with a payment processing unit 160 for receiving a user payment, and may be in communication with a cooling unit 190 for maintaining a storage compartment of vending machine 100 at a predetermined temperature.

Figure 5:
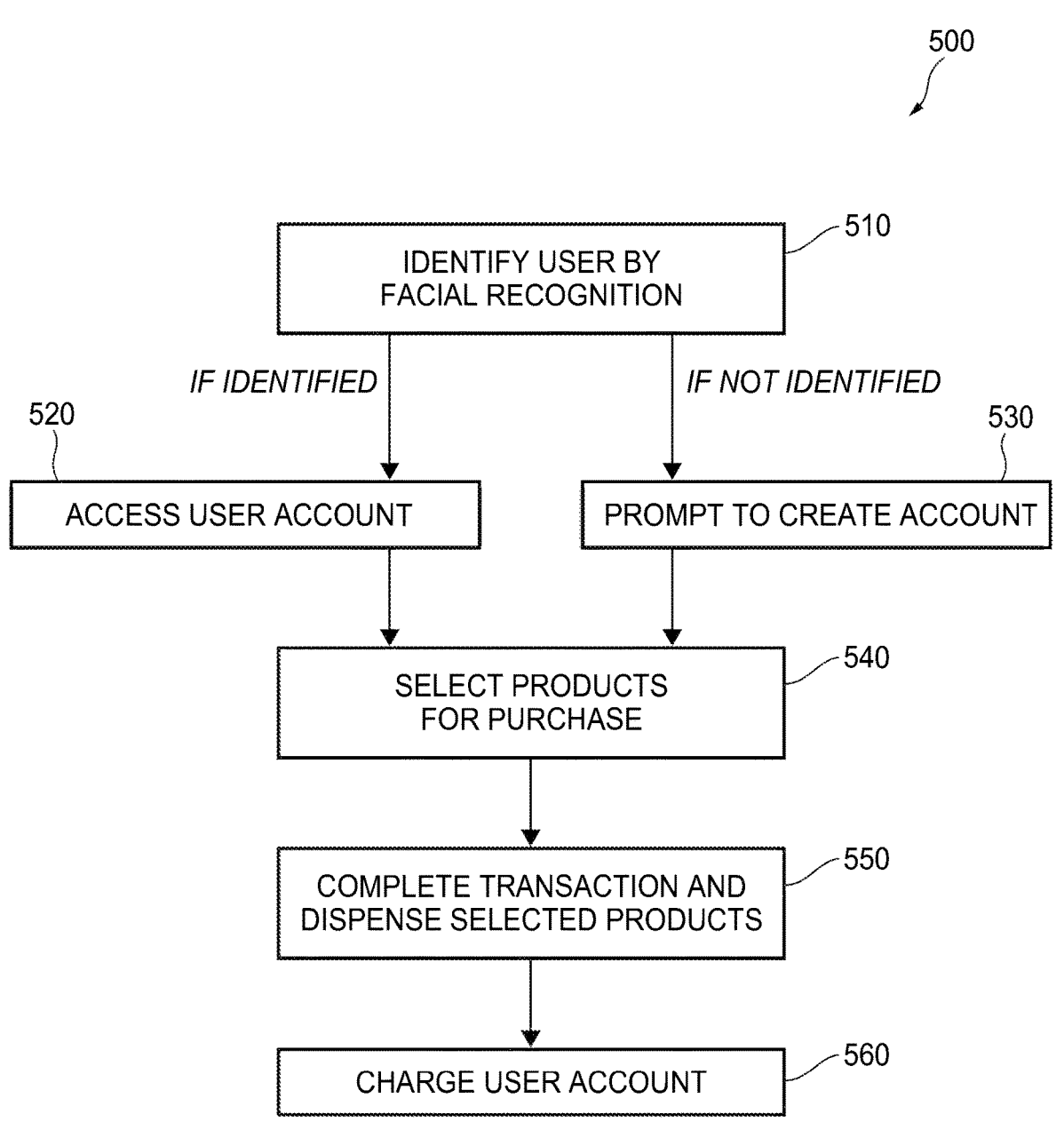
FIG. 5 shows an exemplary method of operating a vending machine according to an embodiment.

An exemplary method of operating a vending machine 500 is shown in FIG. 5. Vending machine may identify a consumer by facial recognition 510. A camera of vending machine may capture an image or video of the consumer that may be analyzed by facial recognition software to determine an identity of the consumer based on known images or videos of the consumer. Once the consumer has been identified, a consumer account linked to the consumer's identity may be accessed 520. The consumer account may include consumer information, including biographical information, a purchase history, a list of favorite products, and payment information, among other information. Payment information may include a linked credit card or bank account, electronic payment account (e.g., PayPal), or the consumer account may be a pre-paid account. If, however, the consumer does not yet have an account or the vending machine is unable to identify the consumer, the consumer may be prompted to create an account 530. Consumer may create a consumer account by providing consumer information as described above, including payment information, via the vending machine or a mobile electronic device. Once the consumer's account has been accessed or created, the consumer may select products for purchase 540. When the consumer has selected all desired products for purchase, the consumer may complete the transaction and dispense the products 550. The consumer account may be charged for the cost of the products dispensed 560. In this way, the consumer need not provide a form of payment at the time the vending machine is used, such as by inserting coins or paper bills, swiping a credit card, scanning a code or the like, and instead the consumer's account may be automatically charged for the dispensed products.

Some embodiments described herein relate to a method for vending a product that includes a natural language search. In this way, the consumer can lead the vending operation, inquiring about specific products and filtering available products. In operation, consumer may navigate available products and make a product selection simply by speaking to the vending machine. This may be particularly valuable to vision-impaired customers who may otherwise have difficulty viewing products in a cabinet, entering payment information, and/or entering a product code on a keypad. Further, as natural language may be used, the consumer need not learn and use specific command phrases to operate the vending machine. Vending machine 100 may include a microphone 117 for receiving audio information from the consumer. As used herein, the term "audio information," may refer to any consumer speech, such as a statement or question.

In some embodiments, vending machine 100 may store or access a database of product information. The database of product information may include a list of products and one or more keywords associated with each product. The database may be stored locally at vending machine 100 or may be stored at a remote computer. Keywords associated with each product may include, for example, a brand (e.g., Pepsi), a flavor (e.g., cherry, cola, lime, etc.), a type of beverage (e.g., carbonated, still, sparkling, soda, sports drink, etc.), ingredient information (e.g., sugar-free, caffeinated, gluten-free, vegan, organic), nutritional information (e.g., diet, low-calorie, etc.), or price, among other words that consumers may use to identify a particular product. In some embodiments, newly-released products or products newly added to vending machine 100 may be associated with a "new" keyword. In one example, a bottle of diet Pepsi may be associated with keywords including but not limited to Pepsi, cola, soda, carbonated, caffeinated, diet, and low-calorie. Thus, a search for a product that is a "diet" product would return diet Pepsi, among other products associated with the keyword "diet."

Figure 6A:
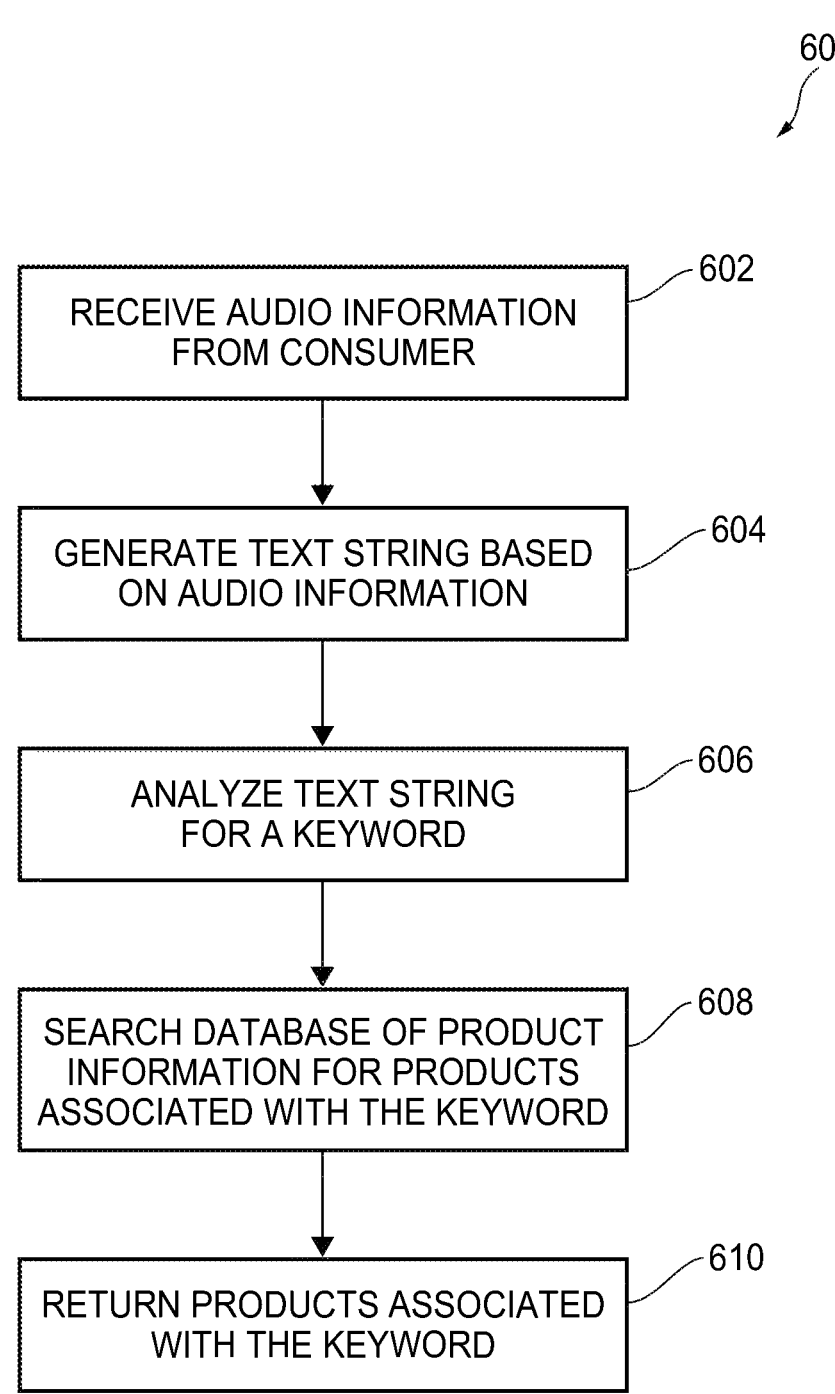
FIG. 6A shows an exemplary method of selecting a product according to an embodiment.

As shown in FIG. 6A, a method of selecting a product via natural language search 600 may include receiving audio information from a consumer 602. The consumer's speech may be recorded in an audio file, and the audio file may be analyzed and used to generate a text string based on the audio information 604. Software or programming for analyzing an audio file and generating a text string are known in the art, such as dictation software. After generating the text string, the text string may be analyzed for the presence of keywords 606. A database of product information may be searched for products associated with the keywords identified in the text string 608. A list of products associated with the keywords in the text string may be returned 610. The list of products may be displayed to the consumer on a display of vending machine, may be read to the consumer by vending machine, or both.

While method 600 may be performed locally at vending machine 100, in some embodiments, one or more of steps may be performed remotely on a remote computer, server, or cloud. In some embodiments, steps 604, 606, 608 may be performed on a remote computer, server or cloud in communication with vending machine 100, such as by a wireless transceiver 119, so that remote computer 450 generates a text string, analyzes the text string, searches the product database and transmits the list of products associated with the keywords to vending machine 100. In this way, vending machine 100 need not have extensive computing capabilities. Vending machine 100 may receive audio information from the consumer, transmit the information to a remote computer, and receive the list of products from the remote computer.

Figure 6B:
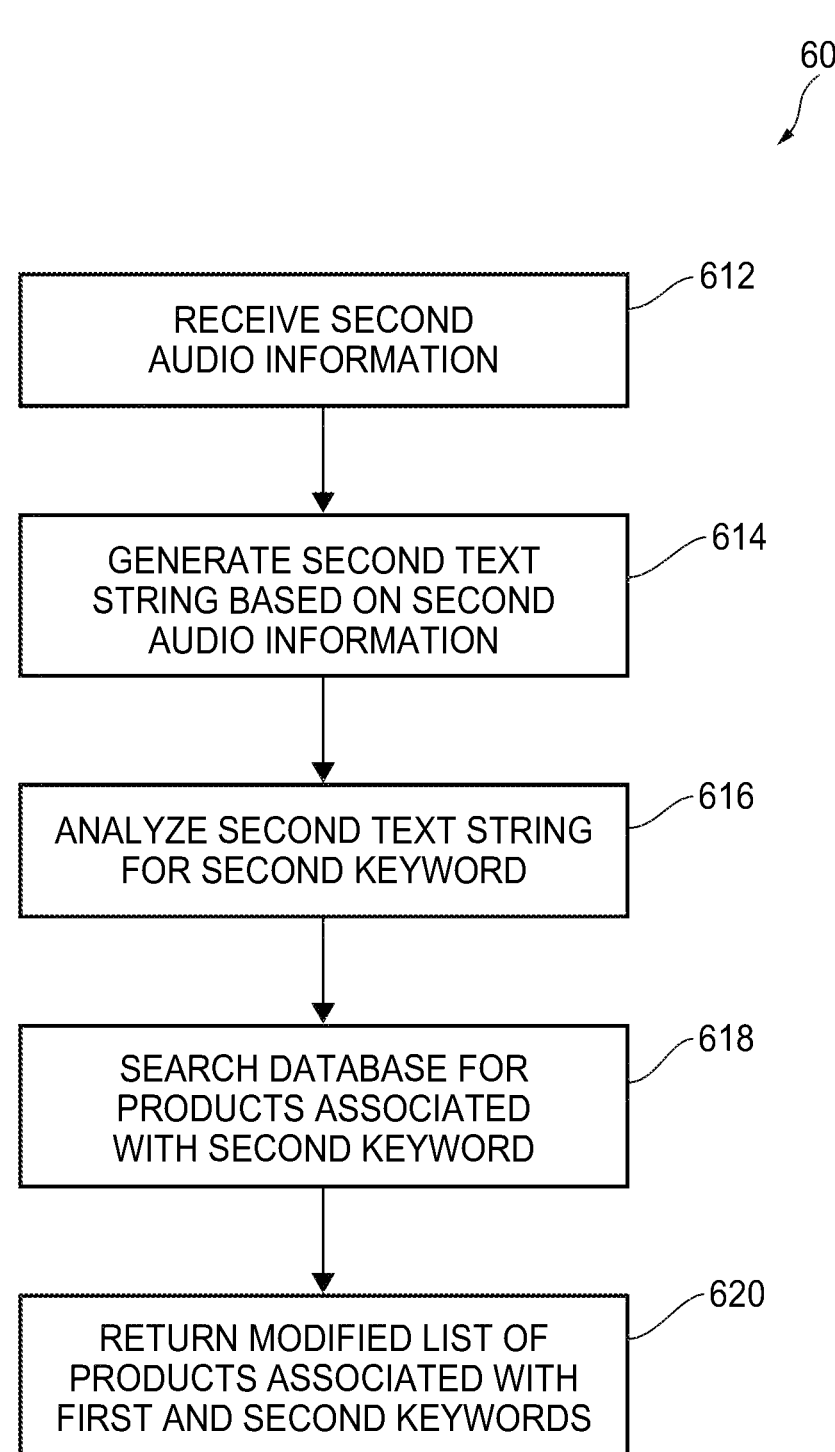
FIG. 6B shows another exemplary method of selecting a product according to an embodiment.

In some embodiments, the method 600 may further include refining the list of products, as shown in FIG. 6B. The vending machine may detect second audible information from a consumer 612. The second audible information may be converted to text 614 and analyzed for a second keyword 616, as discussed above. The database may be searched for products associated with the second keyword 618. The list of products may be modified to include products having first keywords and second keywords. The refined list may be returned 620. Additional refinements may be made in the same manner as desired by the consumer to continue to narrow down the list of products.

For example, a consumer may state "show me products with caffeine." The audible inquiry may be received by a microphone of vending machine, converted to a text string, and the text string may be analyzed for keywords, such as "caffeine." The database of products may then be searched for products having the keyword "caffeine," such as carbonated soft drinks, energy drinks, and coffee-based beverages. A list of caffeinated beverages may be returned to the consumer. The consumer may make a selection based on the list of beverages. Alternatively, the consumer may wish to further narrow the list before choosing. The consumer may state "I want a low calorie beverage." The inquiry may refine the list to show beverages that are associated with being caffeinated and low-calorie.

In some embodiments, audio information may include multiple keywords. In analyzing the consumer's speech, vending machine may further identify logical operators, such as "and," "or," and "no" or "not." For example, if a consumer requests to view products that are diet "and" caffeinated, vending machine may analyze the resulting text string and search product database for products associated with diet and products associated with caffeine. The products may receive a score based on the number of tags, and the vending machine may return products having the highest score (e.g., products associated with the greatest number of tags). For example, a diet decaffeinated beverage would have a score of 1 for "diet," whereas a diet, caffeinated drink would have a score of 2 for "diet" and "caffeine." The product having the score of 2 would be returned to the consumer. In a further example, if the consumer specifies three keywords, but no product matches all three keywords, the highest scoring products, such as a product matching 2 keywords would be returned rather than returning no results. However, in some embodiments, vending machine may indicate that there are no matching products.

In some embodiments, products may be scored based on the percentage of tags associated with the product that are matched. For example, if the user specifies cherry Pepsi, the database will be searched for the keywords "cherry" and "Pepsi." This database may include cherry Pepsi which has keywords "cherry" and "Pepsi," and diet cherry Pepsi which includes keywords "cherry," "Pepsi," and "diet." Based on a score of tags matched, both results would have a score of 2. However, based on a percentage of matched tags, cherry Pepsi would have a score of 100% since both of its tags are matched, whereas diet cherry Pepsi would have a score of 67% since two of three tags matched.

Vending machine may determine that the consumer asked for caffeine "or" diet products, in which case the vending machine may return any diet products and also any caffeinated products. Further, vending machine may recognize "no" caffeine, so that if a consumer states "I want a product with no caffeine," vending machine may return products that do not have the caffeine keyword. Alternatively, rather than searching for products that do not include the keyword "caffeine," "no caffeine" may be a keyword, and products may be associated with a "no caffeine" or "caffeine free" keyword.

Figure 7:
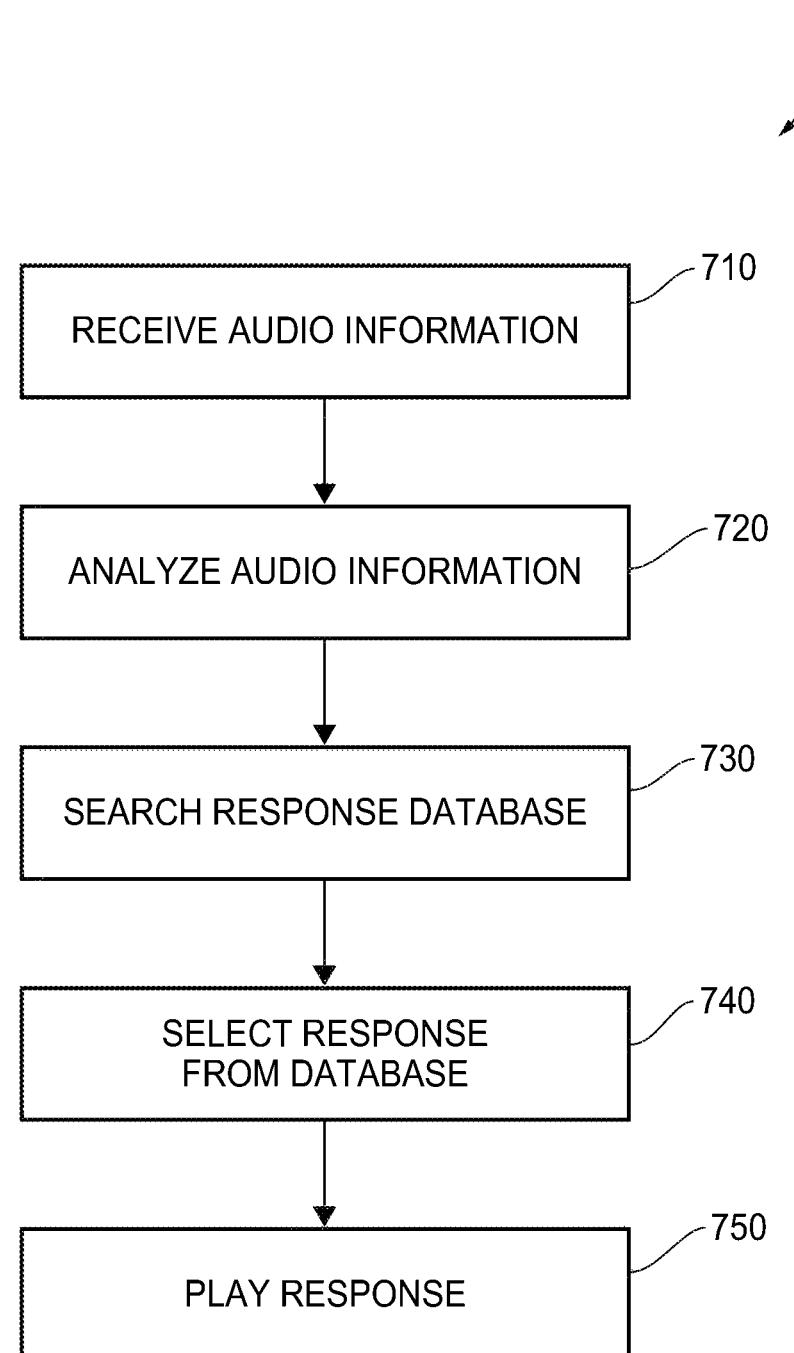
FIG. 7 shows an exemplary method of providing responses to a consumer according to an embodiment.

In some embodiments, vending machine 100 may be configured to respond to the audio information provided by the consumer. In this way, vending machine 100 may provide the experience of having a conversation with the consumer. An exemplary method 700 in which the vending machines communicates with the consumer is shown in FIG. 7. Vending machine may receive audio information 710 from the consumer, such as via a microphone. The audio information may be analyzed 720. As discussed above, the audio information from the consumer may be converted to a text string. The text string may be analyzed, and the vending machine may search a response database containing pre-recorded response 730. Vending machine may select a response 740 from the database based on the audio information. The response may be played 750 to the consumer, such as via a speaker.

For example, if the consumer asks "show me products that are lime-flavored." The text string may be analyzed to recognize a request, "show me," and a keyword "lime" or "lime-flavored." A database of responses may be searched that contain the keyword "lime," so as to repeat and confirm the consumer's request, and the vending machine may respond, for example, by stating "here are lime-flavored products."

In some embodiments, the vending machine may play a prompt for the consumer to narrow the results or make a selection when the consumer's request returns multiple products. For example, if a consumer asks to see "sugar-free" products, the vending machine may show a list of several sugar-free products as described above, and may play a response that includes a prompt to select a particular product, such as "which sugar-free product would you like?"

In some embodiments, a response database may store one or more responses to be provided by the vending machine. Response database may store responses for common questions or statements. For example, consumers may frequently ask "show me products having . . . " The response played may be based on a command in the text string corresponding to the audio information, and/or based on a keyword in the text string. The computer may analyze the audio information to determine that the consumer has made a request (e.g., "show me . . . " or "which products have . . . "). In response, the vending machine may refer to the database of responses to a request, and the request may be specific to keywords in the text string.

In some embodiments, response database may store multiple possible response for a particularly inquiry. For example, in response to a request from the consumer to "show Pepsi products," the database may include several possible responses to a "show me" command such as, "sure," "OK," "Let me do that for you," or "Here are your products," among others. The response may be particular to the keyword "Pepsi," and may include responses such as "Here are Pepsi products" or "which Pepsi product would you like?" When the database includes multiple possible responses to a particular statement or inquiry, the response may be selected at random to prevent the vending machine from repeating the same phrase multiple times and to better mimic natural conversation. Alternatively, the vending machine may play the possible responses in the order in which they are stored in the database so as to cycle through the available responses.

Response database may also store one or more greetings. A greeting may be played when a consumer is initially detected by a camera. Alternatively, a greeting may be played when the consumer is identified by facial recognition. The vending machine may greet the consumer, and may address the consumer by name if the consumer's name is known based on the consumer account.

The response database may also store one or more responses for audio information that cannot be interpreted. If the volume of the audio information provided by the consumer is too low, or if there is too much background noise, the vending machine may be unable to interpret the audio information. Alternatively, if the computer does not recognize the consumer's speech. For example, the response may communicate that the consumer was not heard and request clarification, such as "I'm sorry, can you repeat that?", "Can you say that again?", or "I'm afraid I don't understand." A redirecting response may be played so as to guide the consumer towards a purchasing operation. For example, "I didn't understand that, would you like to purchase a product?" or "I didn't catch that, what products would you like to see?"

Figure 8:
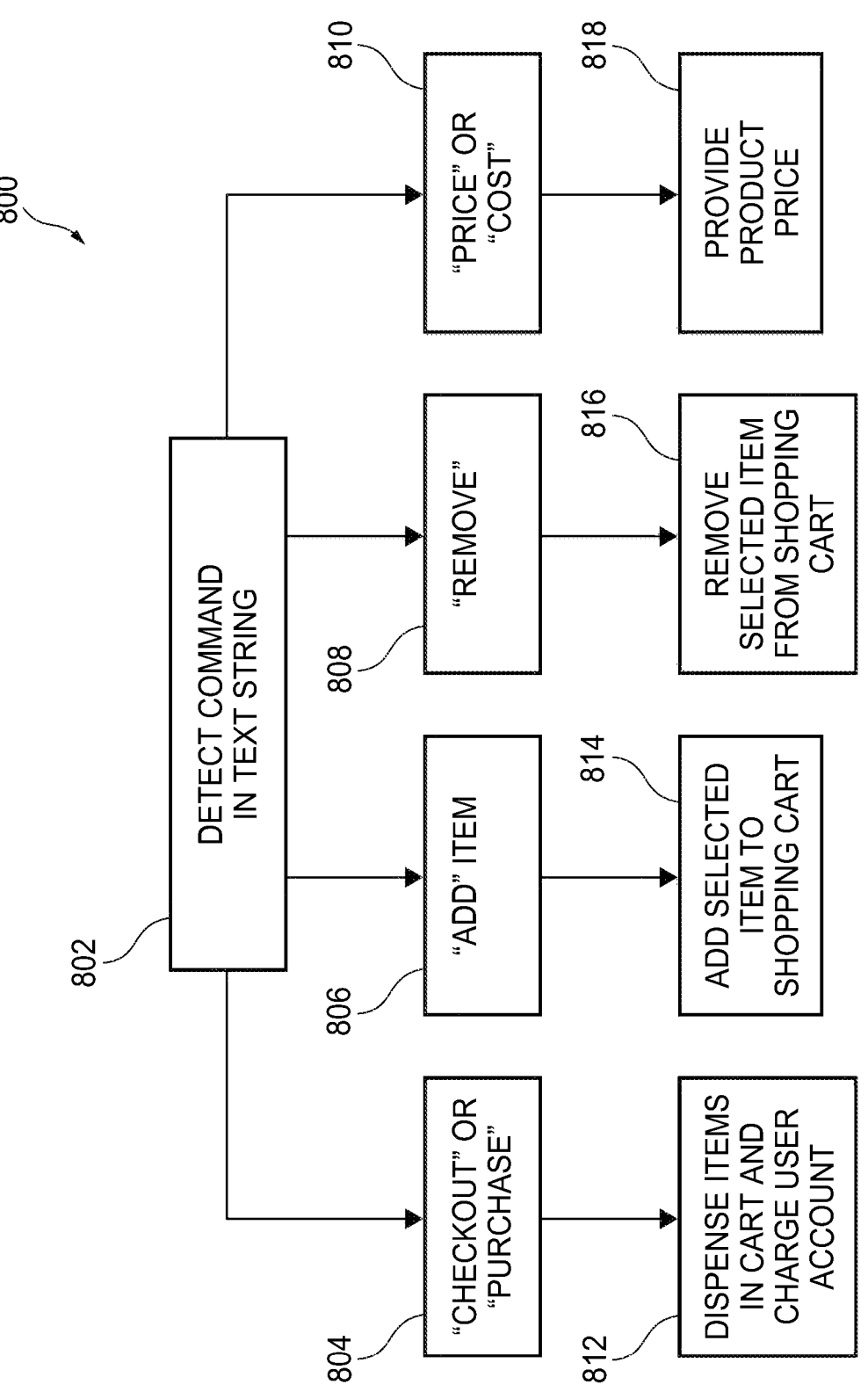
FIG. 8 shows an exemplary embodiment of controlling a vending operation according to an embodiment.

Vending machine may execute commands 800 from the consumer, as shown in FIG. 8. Vending machine may detect a command in a text string 802 based on audio information. Commands may include, checkout or purchase 804, add item 806, remove item 808, and display price or cost 810, among others. If a command is identified in the text string, the vending machine may perform the corresponding action. If the command, "checkout" or "purchase" 804 is identified in the text string, the vending machine may dispense items in the electronic shopping cart and charge the consumer's account or payment method for the dispensed products 812. If the command, "add" or "remove" is identified in the text string, the vending machine may add the selected item to the shopping cart 814 or remove the selected item from the shopping cart 816, respectively. Text string may further be analyzed for the presence of numbers, such as a request to add a certain number of items or remove a certain number of items from the cart. For example, a consumer may state, "add two diet Pepsi to my shopping cart." The text string generated from the audio information may be analyzed to identify a command, "add," and also that "two" items should be added to the electronic shopping cart. If the command, "price" or "cost" is detected, the price or cost of the item may be read or displayed 818. Vending machine may recognize other common commands and provide the appropriate response. In some embodiments, vending machine may also play a response that corresponds to the command. For example, if the consumer states "add item to cart," the vending machine may add the product to the electronic shopping cart and further play a response, such as "the item has been added to your cart."

In some embodiments, vending machine 100 may be configured to provide other information to the consumer. Vending machine 100 may understand a request to show the time, weather, or temperature, and may respond by showing or reading the time, weather or temperature, respectively. Vending machine 100 may further understand a request to show nutritional information for a product, and may response by showing or audibly reading the nutrition information.

Some embodiments described herein relate to vending machines configured to provide a product recommendation to the consumer. In order to assist a consumer in making a purchase, vending machine 100 may be configured to recommend a product for purchase. This may encourage a consumer to make a purchase, and may save the consumer the time otherwise spent reviewing available products for purchase.

Figure 9:
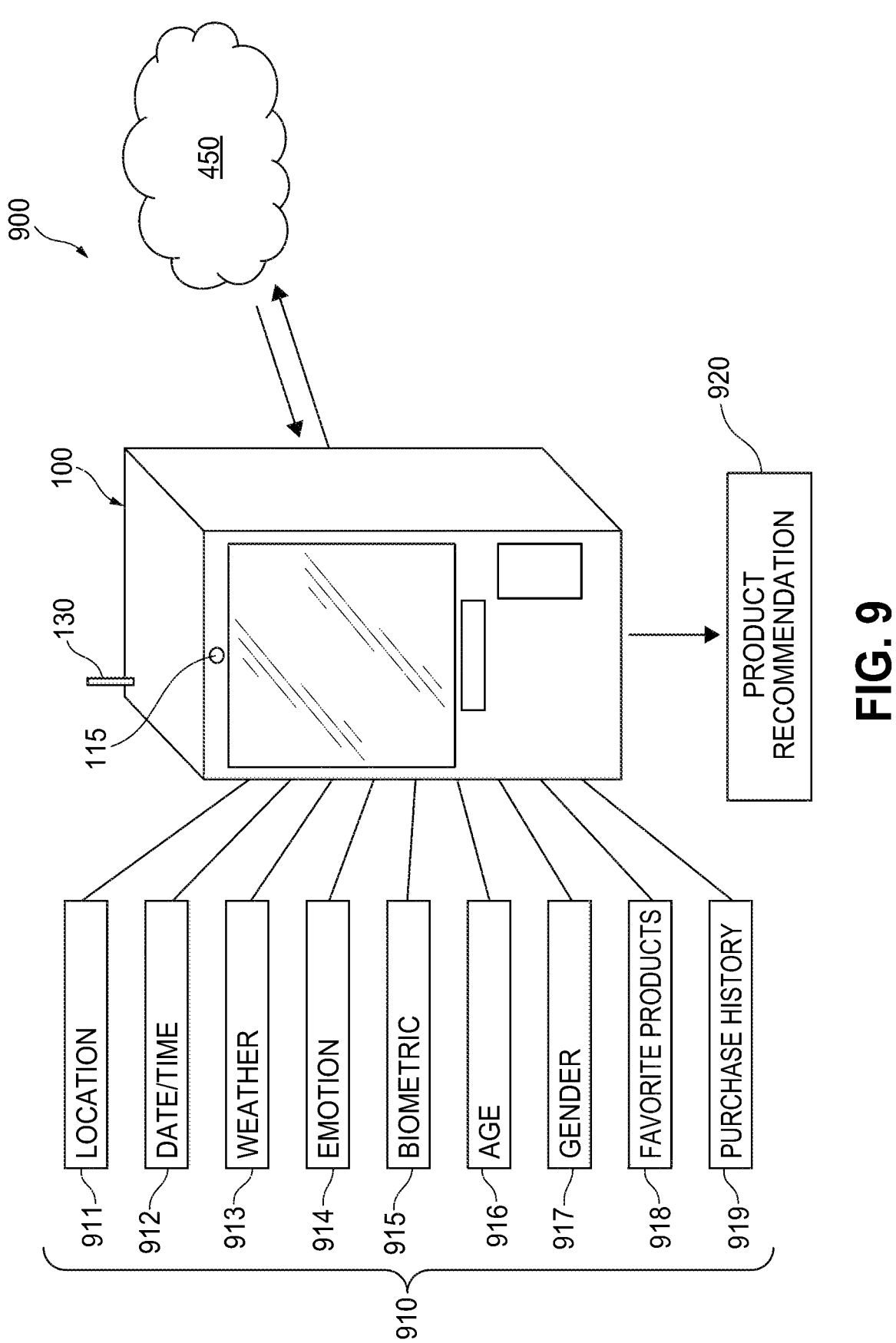
FIG. 9 shows a diagram of a vending machine for providing product recommendations to the consumer.

In some embodiments, vending machine 100 may be configured to provide a product recommendation 920 based on received input information 910, as shown in FIG. 9. Input information 910 may be analyzed by artificial intelligence to determine a product recommendation 920. Input information 910 may include location information 911, such as the physical location of the vending machine. Location information 911 may be used to determine the date and time 912 at the location, and the weather 913 at the location. The product recommendation may additionally or alternatively be based at least in part on user information. User information may include an emotion 914 of the consumer, biometric or physiological information 915, demographic information, such as age 916 or gender 917 of the consumer, a consumer's favorite products 918 or purchase history 919, among other information. Input information 910 provided to vending machine 100 may be transmitted to a remote computer 450 which analyzes the input information to determine a product recommendation, which is transmitted back to the vending machine 100 and output by vending machine 100 to the consumer. In this way, vending machine 100 need not have extensive computing resources and may make use of a remote computer 450 for determining product recommendations.

In some embodiments, vending machine 100 may include a geolocation unit 130, such as global positioning system (GPS) unit, in order to determine the location of vending machine 100. From the location of vending machine 100, a date and time at the location may be readily determined. Further, the weather at the location may be determined. In some embodiments, the location, date, time, weather, or a combination thereof may be used in part to provide a product recommendation.

Vending machine may store or have access to a product database that includes a list of products and one or more tags associated with each product. Tags may be used to categorize products. For example, a "kids" tag may be applied to products popular among kids, a "morning" tag may be applied to products commonly consumed in the morning, and a "hydration" tag may be applied to hydrating products. Tags may be generated and applied to products via machine learning, as discussed in further detail below. Alternatively or additionally, tags may be populated by an operator of the vending machine 100. Product database may be stored locally at vending machine 100 or may be stored on remote computer 450.

The geolocation unit 130 may be used to determine the local time, or a period of time, such as the morning, afternoon or evening. In some embodiments, "morning" may be defined as a particular period of time, such as 6:00 AM to 12:00 PM, and the product recommendation may recommend products associated with a "morning" tag. For example, coffee-based beverages, or juice-based beverages, such as orange juice, which are commonly consumed in the morning may be associated with a "morning" tag. If the local temperature is above a certain threshold, for example, 80° F., the vending machine may recommend products with a "high temperature" tag, such as sparkling water or sports drinks, to provide a refreshing beverage.

In some embodiments, vending machine 100 may include one or more cameras 115 configured to capture images or video of a consumer. Computer vision technology may be used to perform facial recognition of the consumer on the image or video. Computer vision may also be used to determine demographic information about the consumer, such as an approximate age and/or gender of the consumer. In some embodiments, the age and/or gender of the consumer may be used to make a product recommendation. For example, if the vending machine 100 determines that the consumer is a child, products in the database with a "child" or "kids" tag may be recommended, such as chocolate milk or fruit juices.

In some embodiments, vending machine 100 may use machine learning to analyze the purchasing patterns of consumers of different demographics. As vending machine 100 is used over time, vending machine 100 may track each purchase including the approximate age and gender of each consumer and what product the consumer purchased. From this data, the vending machine 100 may determine which products are popular with consumers of different demographics. For example, while children may purchase various products, if over a period of time children frequently purchase chocolate milk, then the vending machine may add a "kids" tag to chocolate milk and may be more likely to recommend chocolate milk to subsequent children who use the vending machine. In another example, over time vending machine 100 may determine that adult women frequently purchase sparkling water, and sparkling water may be given a "women" tag and sparkling water may be more frequently recommended to women. Machine learning may help to recognize patterns in purchasing behavior.

In some embodiments, the vending machine 100 may determine a consumer's emotion. Vending machine 100 may include a camera 115 for capturing images or video that may be analyzed to perform facial recognition and/or gesture analysis. Vending machine 100 may detect if the consumer is happy, sad, angry, or tired, among other emotions. For example, vending machine 100 may detect whether the consumer is smiling or frowning, whether the consumer appears to be tired, such as if the consumer performs gestures including frequently closing eyes or rubbing eyes, whether the consumer is angry such as furrowed eyebrows, among others. Product database may include a list of products that have tags corresponding to an emotion. For example, caffeinated beverages, such as energy drinks or coffee-based drinks may have a "tired" tag to provide tired consumers with a caffeinated beverage.

In some embodiments, machine learning may be used to track the emotion of a consumer and what product the consumer purchased. For example, if over a period of time and multiple transactions the vending machine determines that consumers who are detecting as smiling frequently purchase Product A, Product A may be recommended to future consumers who are smiling. The product database may be updated to add a "happy" tag to Product A. In another example, if consumers who are detected as frowning frequently purchase Product B, Product B may be recommend to future consumers who are frowning and the product database may be updated accordingly.

In some embodiments, vending machine 100 may receive biometric or physiological information from a consumer. Physiological information may be stored on consumer's account. In some embodiments, in order to receive biometric information, vending machine 100 may be configured to communicate with a portable electronic device of a consumer, such as a smartphone, smartwatch, tablet, or the like. Biometric information from portable electronic device may be transmitted to vending machine 100. Biometric information may include information about the user's hydration levels, sleep levels, among other information.

For example, the portable electronic device may track the user's hydration levels throughout the day. If the consumer needs to consume more water to reach the consumer's hydration goal, vending machine 100 may recommend a product tagged with "hydration" tag such as water or sports drinks.

Vending machine 100 may further receive consumer information, such as from a consumer account, which may include age, gender, dietary restrictions, allergies, purchasing history, or a list of favorite products. A consumer's account may include favorite products as populated by the consumer, and may include the consumer's purchasing history. Vending machine 100 may utilize the consumer's favorite products or purchase history in making a product recommendation. Vending machine 100 may determine the consumer's purchasing behavior, and thus may utilize other information when making the product recommendation. For example, purchasing history may indicate that the consumer frequently purchases a particular product on weekend mornings, and may be more likely to recommend that product if the consumer uses the vending machine on a weekend morning. Further, if a consumer's purchasing history indicates that the consumer frequently purchases cherry flavored beverages, vending machine may recommend a new cherry-flavored beverage. Thus, purchasing history and favorite products may inform the product recommendation, and are not necessarily used to recommend the product the consumer has previously purchased.

Vending machine 100 may provide a product recommendation based on one or more of location, time, weather, demographic information (e.g., age and gender), emotion, purchasing history and preferences, and biometric information. Multiple factors may be used to generate a product recommendation. In one example, vending machine may determine that it is 8:00 AM and 90° F. Vending machine 100 may detect that the consumer is an adult male. Consumer may not provide biometric information. Thus, based on the collected information, the vending machine may search a product database for tags, such as "morning," "high temperature," "male," and "adult." The database may have multiple products with a morning tag, and the list may be narrowed by also searching for products with a "male" tag, and further by products having an "adult" tag. In this way, the vending machine may generate a product recommendation that is popular among adult males, particularly in the morning. Some factors may be given greater weight in providing the recommendation, thus in some embodiments, "male" may be given higher weight in the recommendation than "morning." Further, the consumer's purchase history, if available, may inform the product recommendation.

Figure 10:
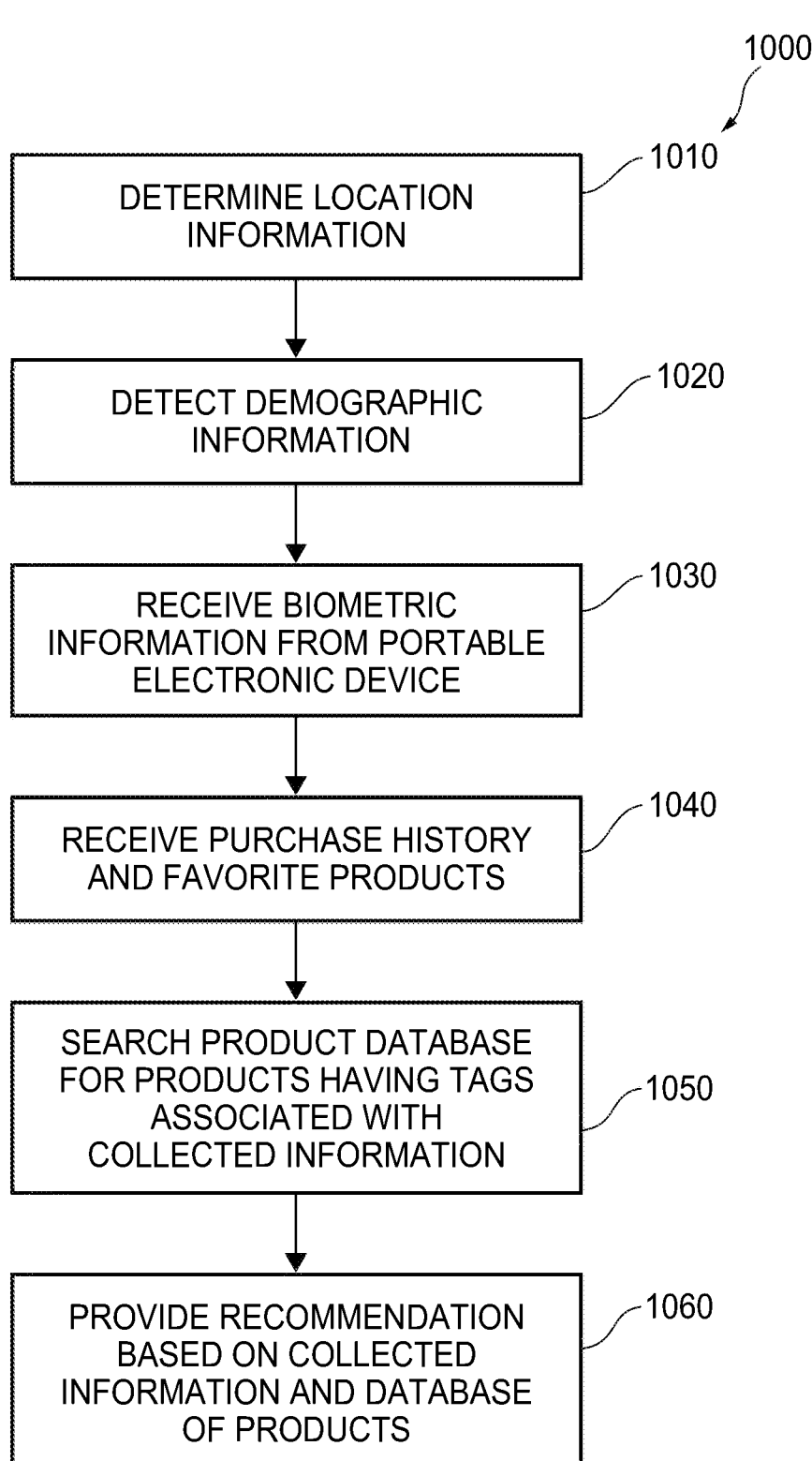
FIG. 10 shows a method of determining a product recommendation for a consumer according to an embodiment.

A method for determining a product recommendation based on input information is shown by method 1000 in FIG. 10. Vending machine may determine location information 1010. Location information may be determined by a geolocation unit of the vending machine, and the location information may include a local time and weather information, such as the temperature. Vending machine may detect demographic information 1020 of the consumer, such as an approximate age and gender of the consumer, such as via a camera of the vending machine. Vending machine may further receive biometric information from a portable electronic device 1030, such as a smartphone, smartwatch, fitness tracker, or the like. Vending machine may receive a purchase history and favorite products 1040 of a consumer, such as by accessing the consumer's account. A product database may be searched for products having tags associated with the collected input information 1050. Each factor may be assigned a relative weight, such that some information is given greater consideration in the product recommendation. For example, if biometric information is provided from the user's portable electronic device, such information may be given a relatively high weight due to the accuracy and personalized information. Vending machine may then provide a product recommendation based on the collected input information and the product database 1060.

Figure 11:
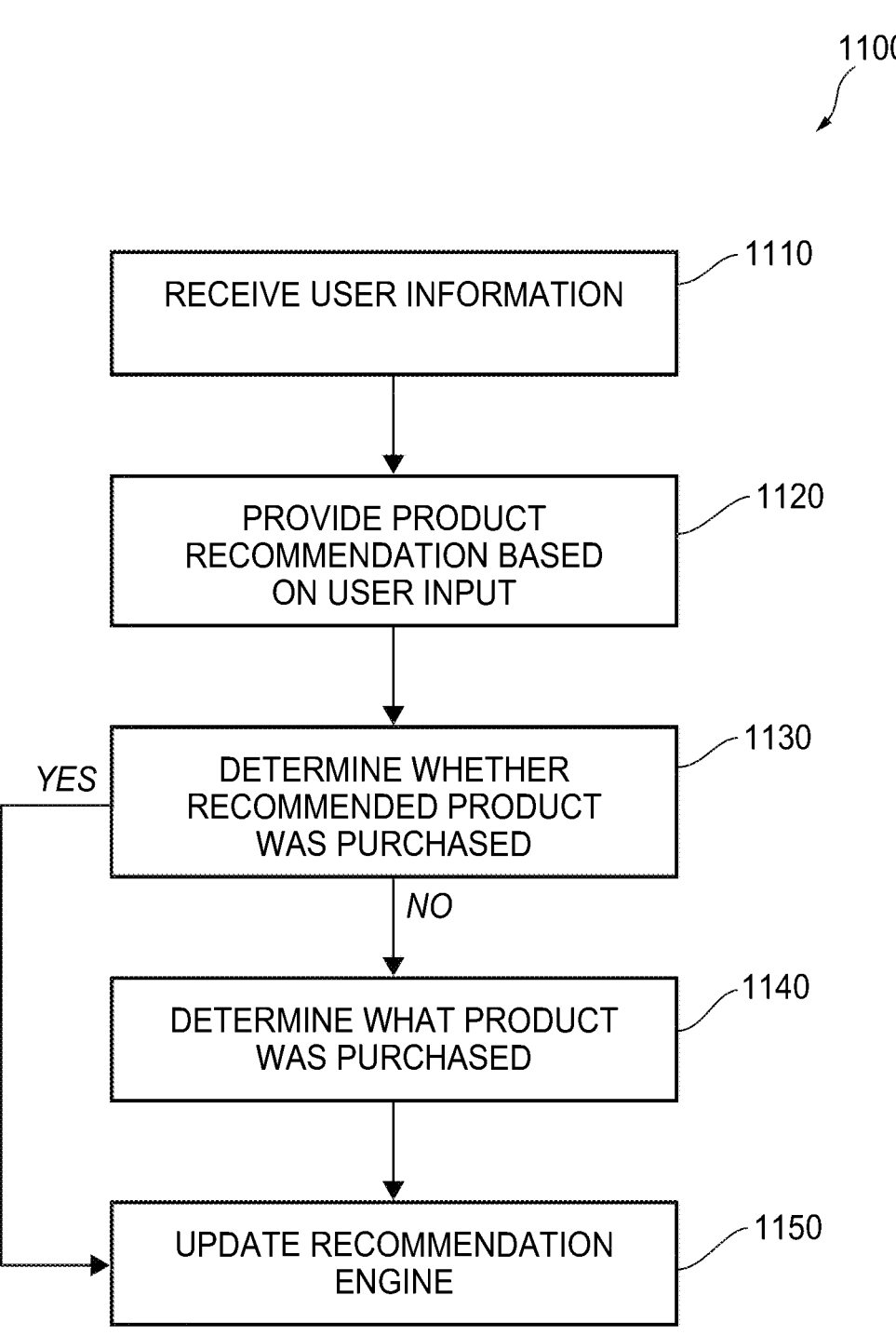
FIG. 11 shows a method of improving product recommendations according to an embodiment.

In some embodiments, the vending machine may use machine learning to adjust the product recommendations based on the acceptance rate of the product recommendation. As shown in FIG. 11, a method 1100 of revising a product recommendation may include receiving user information 1110 and providing a product recommendation based on the user information 1120, as discussed above with respect to FIG. 10 and method 1000. The vending machine may track what product is recommended and whether the consumer purchases the recommended product 1130. If the recommended product was not purchased, the vending machine may determine what product was purchased by the consumer 1140. The vending machine may update its recommendation 1150 based on whether the consumer accepted the product recommendation or if the consumer selected another product. If the consumer purchases the recommended product, the recommended product may receive greater weight in the recommendation determination. If the consumer does not accept the product recommendation, the vending machine may revise its product recommendation for future consumers. In this way, the product recommendation and the likelihood of the consumer accepting the product recommendation may be improved over time.

Figure 12:
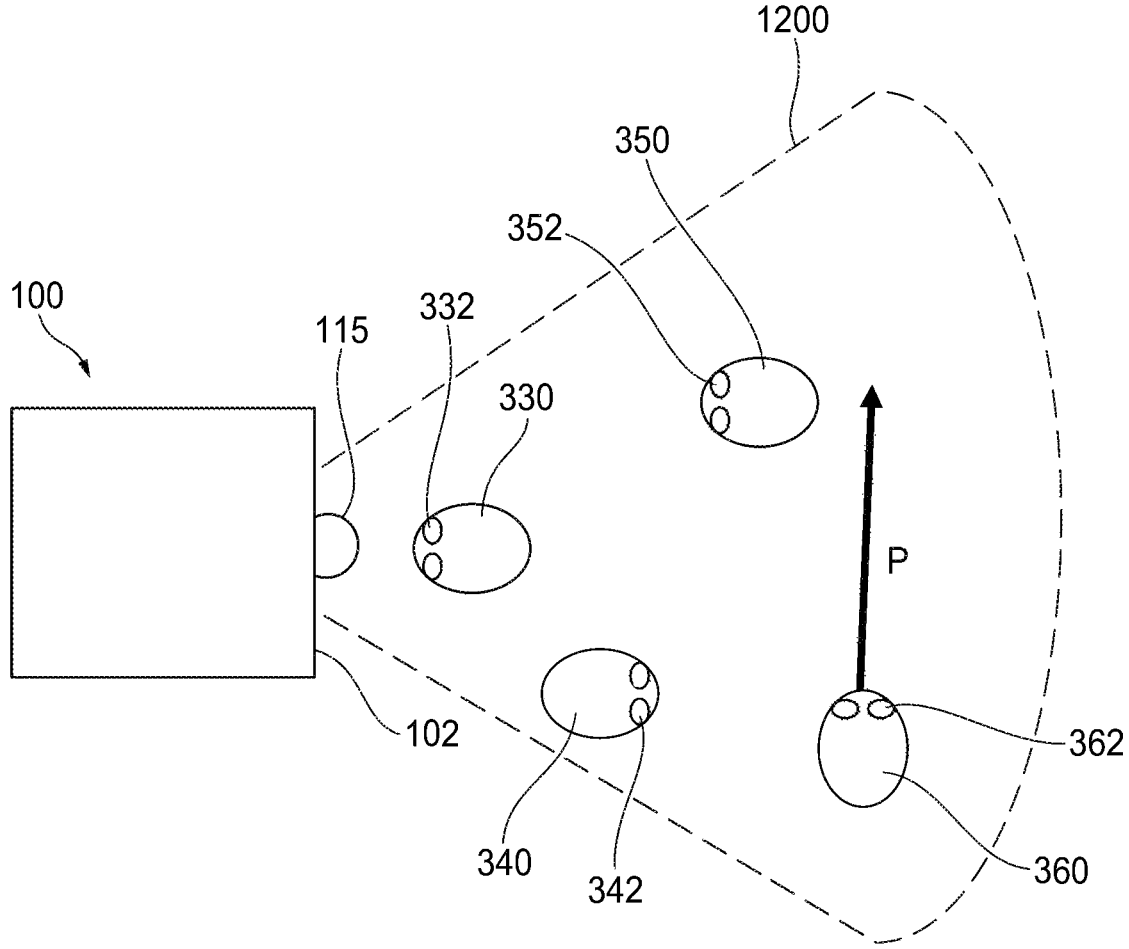
FIG. 12 shows a top-down diagram of a vending machine illustrating detection of consumers by the vending machine according to an embodiment.

Some embodiments described herein relate to determining engagement of the consumer at the vending machine, as shown in FIG. 12. Vending machine 100 may include one or more cameras 115 having a field of view 1200 around at least a portion of vending machine 100. In some embodiments, one or more cameras 115 may be oriented facing an area in front of vending machine 100. In some embodiments, camera 115 may be configured to detect a location of a consumer with respect to vending machine 100, an orientation of the consumer with respect to vending machine 100 (i.e., what direction the consumer is facing), and/or a path of the consumer moving in the field of view 1200. The vending machine 100 may take different actions depending on the location, orientation, and path of the consumer.

Figure 13:
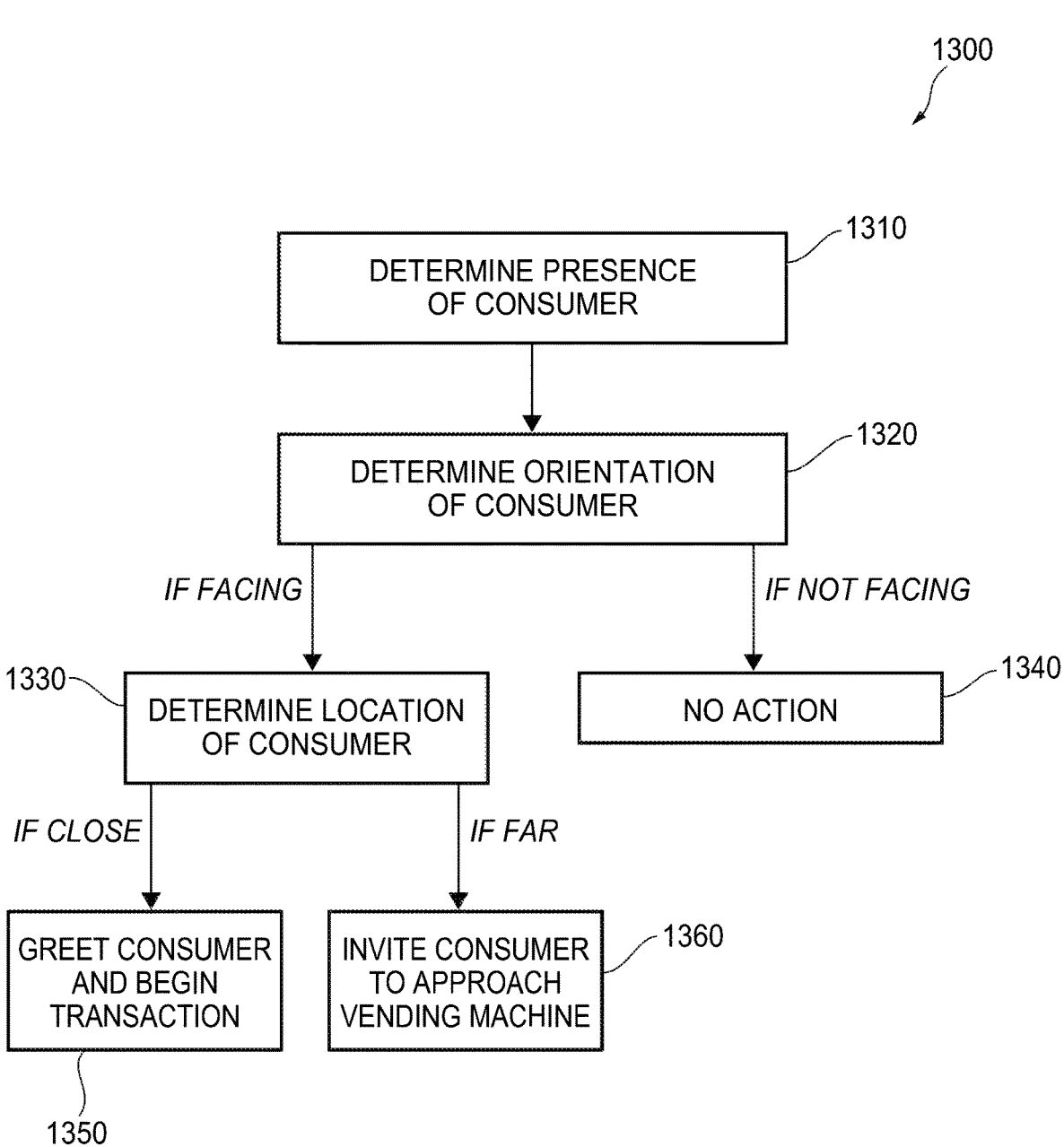
FIG. 13 shows a method of determining consumer engagement according to an embodiment.

An exemplary method 1300 of engaging a consumer is shown for example in FIG. 13. Vending machine may detect a presence of a consumer near vending machine 1310. Vending machine further detect an orientation of consumer 1320 with respect to the vending machine. Vending machine may detect if consumer is facing the vending machine. If the consumer is not facing the vending machine, vending machine may take no action 1340 and may not attempt to interact with the consumer. If the consumer is oriented facing the vending machine, vending machine may further determine a location of the consumer 1330. If the consumer is outside of a predetermined distance, vending machine may attempt to attract the consumer 1360. For example, vending machine may play a message inviting the consumer to approach the vending machine. If the consumer is inside of the predetermined distance, vending machine may greet the consumer 1350 and attempt to begin a transaction.

In some embodiments, vending machine 100 may determine an orientation of the consumer by detecting an eye or eyes of the consumer, as shown in FIG. 12. If a consumer's eye or eyes are looking at the vending machine 100 as determined by camera 115, vending machine 100 may determine that the consumer is oriented facing the vending machine 100, and vending machine 100 may attempt to engage the consumer or begin a transaction. For example, a first consumer 330 may be close to vending machine 100 and camera 115 may detect consumer's eyes 332 to determine that first consumer 330 is facing vending machine 100. If vending machine 100 is unable to detect the consumer's eyes 342, such as if a second consumer 340 is standing facing away from the vending machine 100, vending machine 100 may not attempt to engage the second consumer 340. A third consumer 350 may be far from vending machine 100 and camera 115 may detect consumer's eyes 352 and may attempt to attract third consumer 350 to the vending machine 100. Further, if a fourth consumer 360 is walking by vending machine 100, such that only a portion of the consumer's eye 362 is visible, vending machine 360 may determine that the consumer is oriented so that the consumer is not facing the vending machine 100, and again vending machine 100 may not attempt to engage the consumer. The ability to determine the orientation of the consumer may be helpful in crowded areas, such as train platforms, airports, and the like where many consumers may be present nearby vending machine 100. This helps to prevent vending machine from attempt to interact with any consumer present in the area and helps to ensure that vending machine interacts only with potential consumers who show interest in the vending machine.

In some embodiments, camera 115 of vending machine 100 may determine whether a consumer is moving, and may determine a path P of a consumer 360. The path P may be used to determine if consumer is approaching vending machine 100 or is moving in a different direction. Vending machine 100 may attempt to interact with consumer, such as by playing a greeting, if the consumer's path is directed toward or is approaching vending machine 100. However, if the consumer's path is not moving toward vending machine 100 (e.g., fourth consumer 360), such as if a consumer is walking by the vending machine, vending machine 100 may not attempt to interact with consumer.

In some embodiments, vending machine 100 may be configured to perform noise-cancellation to eliminate noise from consumers who are not interacting with vending machine 100. This may help to improve the accuracy of the vending machine's detection of consumer speech. This may also help to prevent the vending machine from responding to other consumers in the nearby area rather than to the consumer performing a transaction.

In some embodiments, vending machine 100 may detect a consumer's lips. If a consumer is at the vending machine 100 and is engaging vending machine 100 in a transaction, vending machine 100 may employ noise cancellation to remove background noise from other consumers in the area that are not interacting with vending machine 100. Vending machine 100 may detect the presence of a consumer and may detect the consumer's eyes and lips. If a consumer is engaging with the vending machine and is looking at the vending machine, the vending machine may detect the audio. If the consumer is not looking at the vending machine but is talking, the vending machine may not detect the audio. For example, if the consumer is talking to a companion nearby the vending machine, the machine may not detect the conversation. Further, the vending machine may record the audio when the consumer's lips are moving. In this way, audio detected when the consumer's lips are not moving may not be analyzed.

In some embodiments, computer vision may be employed to read a consumer's lips. Reading a consumer's lips may help to improve the accuracy of speech recognition. For example, if the consumer is in an area with a lot of ambient noise, the audio may be difficult to convert to a text string, and the use of lip reading may help to improve the accuracy of speech recognition.

Figure 14:
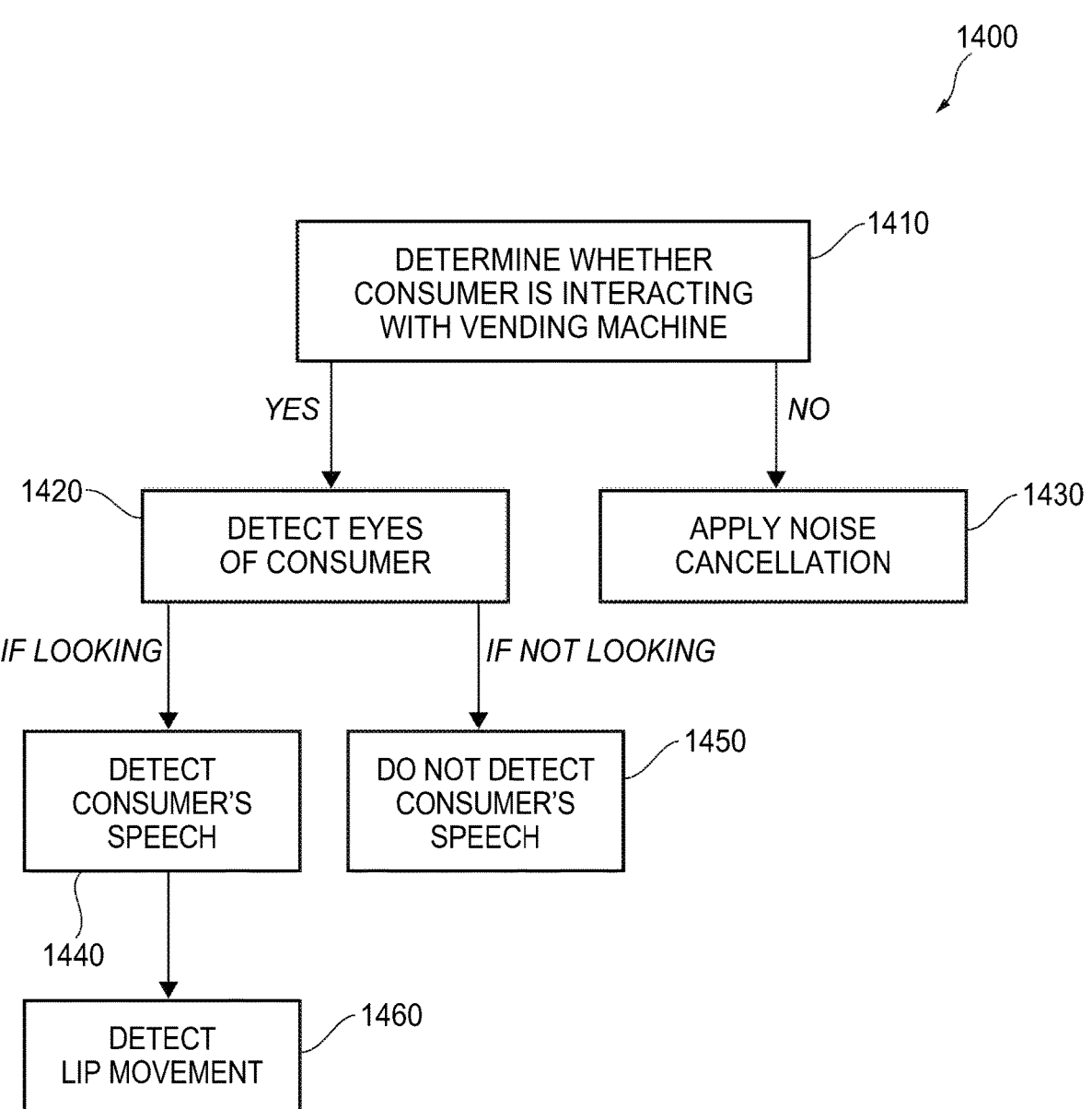
FIG. 14 shows a method of improving detection of a consumer's speech according to an embodiment.

In an exemplary method 1400 of interacting with a consumer is shown in FIG. 14. Vending machine may determine whether a consumer is interacting with vending machine 1410. If the consumer is not interacting, vending machine may apply noise cancellation to the consumer's speech 1430. If the consumer is interacting with vending machine, the vending machine may further detect the eyes of the consumer 1420. If the consumer is looking at the vending machine, the vending machine may detect the consumer's speech 1440. Vending machine may further track movement of consumer's lips to attempt to "read" the consumer's lips to improve speech recognition 1460. If the consumer is not looking, vending machine may not detect the consumer's speech 1450.

Figure 15:
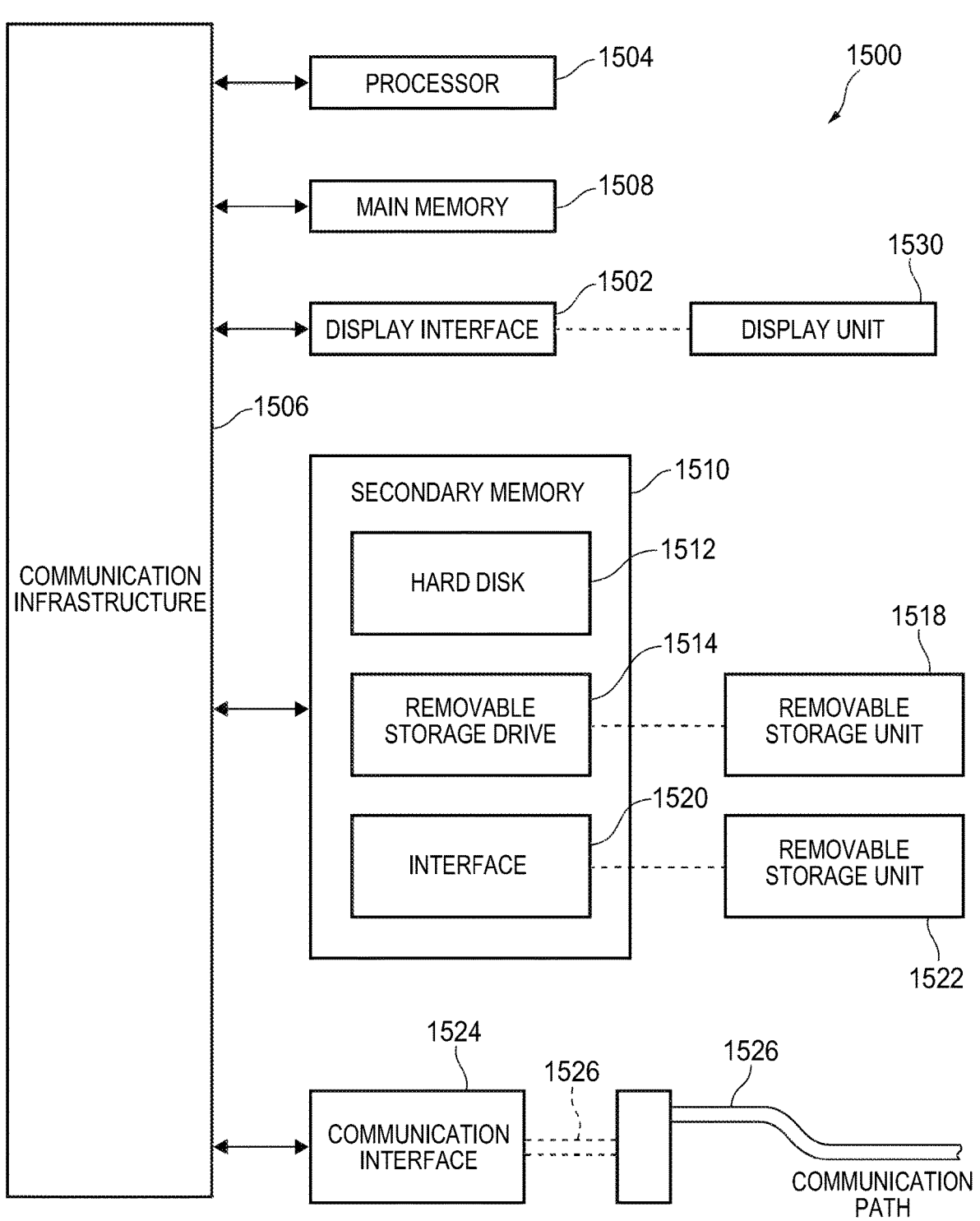
FIG. 15 shows a schematic block diagram of an exemplary computer system in which embodiments may be implemented

FIG. 15 illustrates an exemplary computer system 1500 in which embodiments, or portions thereof, may be implemented as computer-readable code. A control unit 140 as discussed herein may be a computer system having all or some of the components of computer system 1500 for implementing processes discussed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments may be implemented in terms of this example computer system 1500. After reading this description, it will become apparent to a person skilled in the relevant art how to implement one or more of the invention(s) using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1504 may be a special purpose or a general purpose processor device. As will be appreciated by persons skilled in the relevant art, processor device 1504 may also be a single processor in a multi-core/multiprocessor system, such system operating alone, or in a cluster of computing devices operating in a cluster or server farm. Processor device 1504 is connected to a communication infrastructure 1506, for example, a bus, message queue, network, or multi-core message-passing scheme.

Computer system 1500 also includes a main memory 1508, for example, random access memory (RAM), and may also include a secondary memory 1510. Secondary memory 1510 may include, for example, a hard disk drive 1512, or removable storage drive 1514. Removable storage drive 1514 may include a floppy disk drive, a magnetic tape drive, an optical disk drive, a flash memory, or the like. The removable storage drive 1514 reads from and/or writes to a removable storage unit 1518 in a well-known manner. Removable storage unit 1518 may include a floppy disk, magnetic tape, optical disk, a universal serial bus (USB) drive, etc. which is read by and written to by removable storage drive 1514. As will be appreciated by persons skilled in the relevant art, removable storage unit 1518 includes a computer usable storage medium having stored therein computer software and/or data.

Computer system 1500 (optionally) includes a display interface 1502 (which can include input and output devices such as keyboards, mice, etc.) that forwards graphics, text, and other data from communication infrastructure 1506 (or from a frame buffer not shown) for display on display 1540.

In alternative implementations, secondary memory 1510 may include other similar means for allowing computer programs or other instructions to be loaded into computer system 1500. Such means may include, for example, a removable storage unit 1522 and an interface 1520. Examples of such means may include a program cartridge and cartridge interface (such as that found in video game devices), a removable memory chip (such as an EPROM, or PROM) and associated socket, and other removable storage units 1522 and interfaces 1520 which allow software and data to be transferred from the removable storage unit 1522 to computer system 1500.

Computer system 1500 may also include a communication interface 1524. Communication interface 1524 allows software and data to be transferred between computer system 1500 and external devices. Communication interface 1524 may include a modem, a network interface (such as an Ethernet card), a communication port, a PCMCIA slot and card, or the like. Software and data transferred via communication interface 1524 may be in the form of signals, which may be electronic, electromagnetic, optical, or other signals capable of being received by communication interface 1524. These signals may be provided to communication interface 1524 via a communication path 1526. Communication path 1526 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 1518, removable storage unit 1522, and a hard disk installed in hard disk drive 1512. Computer program medium and computer usable medium may also refer to memories, such as main memory 1508 and secondary memory 1510, which may be memory semiconductors (e.g. DRAMs, etc.).

Computer programs (also called computer control logic) are stored in main memory 1508 and/or secondary memory 1510. Computer programs may also be received via communication interface 1524. Such computer programs, when executed, enable computer system 1500 to implement the embodiments as discussed herein. In particular, the computer programs, when executed, enable processor device 1504 to implement the processes of the embodiments discussed here. Accordingly, such computer programs represent controllers of the computer system 1500. Where the embodiments are implemented using software, the software may be stored in a computer program product and loaded into computer system 1500 using removable storage drive 1514, interface 1520, and hard disk drive 1512, or communication interface 1524.

Embodiments of the invention(s) also may be directed to computer program products comprising software stored on any computer useable medium. Such software, when executed in one or more data processing device, causes a data processing device(s) to operate as described herein. Embodiments of the invention(s) may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

What is claimed is:

1. A method of providing a product recommendation to a consumer by a vending machine, comprising:

accessing, by the vending machine, a product database that includes product tags that correspond to products in the product database, wherein the product tags correspond to product categories for the products in the product database;

receiving, by the vending machine, location information at the vending machine via a geolocation unit;

determining, by the vending machine, environment information based on the location information from the geolocation unit;

receiving, by the vending machine, user information at the vending machine;

determining, by the vending machine, one or more environment tags corresponding to the environment information and one or more user tags corresponding to the user information;

determining, by the vending machine, the one or more environment tags correspond to at least one of the product tags and at least a first product category;

determining, by the vending machine, the one or more user tags correspond to at least one of the product tags and at least a second product category;

identifying, by the vending machine, products in the product database associated with the first product category and the second product category; and providing, by a display of the vending machine, a product recommendation based on the identified products.

2. The method of claim 1, wherein receiving user information comprises receiving biometric information from a portable electronic device of a user.

3. The method of claim 2, wherein the biometric information comprises a user's hydration levels, and wherein at least one of the product categories comprises a hydration category associated with the user's hydration levels, and the product recommendation is provided from a list of hydration products.

4. The method of claim 2, wherein the biometric information comprises a user's sleep levels.

5. The method of claim 1, wherein the environment information comprises a time at a location of the vending machine, and at least one of the one or more categories corresponds to the time.

6. The method of claim 1, wherein the environment information comprises a temperature at a location of the vending machine, and at least one of the one or more categories corresponds to the temperature.

7. The method of claim 1, wherein the environment information comprises a weather condition at a location of the vending machine, and at least one of the one or more categories corresponds to the weather condition.

8. The method of claim 1, wherein the vending machine comprises a camera and the method further comprises capturing one of an image or a video of the consumer with a camera to obtain the user information and performing one of facial recognition or gesture analysis of the user information to determine a user characteristic.

9. The method of claim 8, wherein the user characteristic comprises an emotion of the consumer as determined by the facial recognition or gesture recognition, and at least one of the one or more categories corresponds to the emotion.

10. The method of claim 8, wherein the user characteristic comprises an age of the consumer as determined by the facial recognition, and at least one of the one or more categories is an age category based on the age, and the product recommendation is a list of popular products based on the age category.

11. The method of claim 8, further comprising determining purchasing patterns of consumers using machine learning based on the facial recognition.

12. The method of claim 1, wherein the user information comprises purchase history of the consumer.

13. The method of claim 1, further comprising:

transmitting the environment information and the user information to a remote computer, separate from the vending machine, analyzing, at the remote computer, the environment information and the user information to determine the product recommendation, and transmitting the product recommendation back to the vending machine.

14. The method of claim 1, wherein the environment information and the user information comprise a plurality of factors, and each of the plurality of factors are assigned a weight that biases the product recommendation.

15. A method of providing a product recommendation to a consumer by a vending machine, comprising:

receiving, by the vending machine, location information at the vending machine;

receiving, by the vending machine, user information at the vending machine via a camera of the vending machine or a portable electronic device of the consumer in communication with the vending machine;

determining, by the vending machine, a user characteristic based on the user information obtained from the camera or the portable electronic device of the consumer;

determining, by the vending machine, a first category corresponding to the location information and the user characteristic;

identifying a first list of products in a product database associated with the first category; and providing a product recommendation based on the first category, wherein providing the product recommendation comprises displaying the first list of products on a display of the vending machine.

16. The method of claim 15, further comprising:

determining a second category different from the first category, the second category corresponding to the location information and the user characteristic;

identifying a second list of products in the product database associated with the first category and the second category; and updating the product recommendation based on the first category and the second category, wherein updating the product recommendation comprises displaying the second list of products on the display of the vending machine.

17. The method of claim 16, further comprising:

assigning a first weight to the first category;

assigning a second weight to the second category; and biasing the product recommendation based on the first weight and the second weight.

18. The method of claim 17, further comprising, accepting the product recommendation by the consumer, and increasing a relative weight of the first weight.

19. The method of claim 17, further comprising determining an accuracy of the user information associated with the first category and the second category, and increasing a relative weight of the first weight when the first category is determined to be more accurate than the second category.

20. The method of claim 15, wherein the user information comprises one or more of a hydration level, a sleep level, an age of the consumer, a gender of the consumer, or an emotion of the consumer.

\*   \*   \*   \*   \*